(12) United States Patent
Sashida et al.

(10) Patent No.: US 11,137,554 B2
(45) Date of Patent: Oct. 5, 2021

(54) OPTICAL CONNECTION STRUCTURE

(71) Applicant: SUMITOMO ELECTRIC INDUSTRIES, LTD., Osaka (JP)

(72) Inventors: Takako Sashida, Osaka (JP); Takuro Watanabe, Osaka (JP); Takayuki Shimazu, Osaka (JP); Dai Sasaki, Osaka (JP); Hajime Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/960,738

(22) PCT Filed: Nov. 14, 2018

(86) PCT No.: PCT/JP2018/042152
§ 371 (c)(1),
(2) Date: Jul. 8, 2020

(87) PCT Pub. No.: WO2019/146222
PCT Pub. Date: Aug. 1, 2019

(65) Prior Publication Data
US 2020/0371300 A1  Nov. 26, 2020

(30) Foreign Application Priority Data
Jan. 23, 2018  (JP) .............................. JP2018-008840

(51) Int. Cl.
*G02B 6/40* (2006.01)
*G02B 6/38* (2006.01)

(52) U.S. Cl.
CPC .......... *G02B 6/406* (2013.01); *G02B 6/3869* (2013.01); *G02B 6/3881* (2013.01); *G02B 6/3885* (2013.01)

(58) Field of Classification Search
None
See application file for complete search history.

(56) References Cited

U.S. PATENT DOCUMENTS

| 6,315,590 B1 | 11/2001 | Grois et al. |
| 6,364,536 B1 | 4/2002 | Chen et al. |
| 2009/0274432 A1 | 11/2009 | Iwaya |

(Continued)

FOREIGN PATENT DOCUMENTS

| EP | 1273944 A1 | 1/2003 |
| JP | 2001-313119 A | 11/2001 |

(Continued)

*Primary Examiner* — Jerry Rahll
(74) *Attorney, Agent, or Firm* — Oliff PLC

(57) ABSTRACT

An optical connection structure including N first inner housings, a first outer housing, N second inner housings, and a second outer housing. The respective first inner housings hold M first ferrules. The first outer housing holds the first inner housings in an arranged state. The respective second inner housings hold M second ferrules. The second outer housing holds the second inner housings in an arranged state. The optical connection structure includes a first latch mechanism that restrict a movement of the first inner housing relative to the first outer housing in a pullout direction, a second latch mechanism that couples the first inner housing and the second inner housing to each other, and a latch releasing mechanism that releases the first latch mechanism in a state where the first inner housing and the second inner housing are coupled to each other by the second latch mechanism.

19 Claims, 13 Drawing Sheets

(56) References Cited

U.S. PATENT DOCUMENTS

| | | |
|---|---|---|
| 2009/0279832 A1 | 11/2009 | Andrei et al. |
| 2011/0091158 A1 | 4/2011 | Iwaya et al. |
| 2014/0044395 A1 | 2/2014 | Waldron et al. |
| 2014/0241689 A1 | 8/2014 | Bradley et al. |
| 2015/0346438 A1 | 12/2015 | Kato |
| 2018/0306984 A1 | 10/2018 | Otomitsu |

FOREIGN PATENT DOCUMENTS

| | | |
|---|---|---|
| JP | 2002-082254 A | 3/2002 |
| JP | 2009-210669 A | 9/2009 |
| JP | 2015-227938 A | 12/2015 |
| JP | 2017-134310 A | 8/2017 |
| WO | 2009/110421 A1 | 9/2009 |

OPTICAL CONNECTION STRUCTURE

TECHNICAL FIELD

The present disclosure relates to an optical connection structure. The present application is based upon and claims the benefit of the priority from Japanese Patent Application No. 2018-008840, filed on Jan. 23, 2018, the entire content of which is incorporated herein by reference.

BACKGROUND ART

Patent Literature 1 discloses a connector housing including an outer housing mounted on a substrate, and an inner housing accommodated in the outer housing to hold an MPO connector.

CITATION LIST

Patent Literature

Patent Literature 1: U.S. Unexamined Patent Publication No. 2009/0279832

SUMMARY OF INVENTION

The present disclosure provides an optical connection structure. The optical connection structure includes N first inner housings, a first outer housing, N second inner housings, and a second outer housing, wherein N is an integer of two or greater. Each of the first inner housings is configured to hold M first ferrules in a state where end surfaces of the first ferrules of which each holds an end portion of a first optical fiber extending along a first direction are exposed, wherein M is an integer of one or greater. The first outer housing holds the N first inner housings in a state of being arranged in a second direction intersecting the first direction. Each of the second inner housings is configured to hold M second ferrules in a state where end surfaces of the second ferrules of which each holds an end portion of a second optical fiber extending along the first direction are exposed. The second outer housing holds the N second inner housings in a state of being arranged in the second direction. The first outer housing and the second outer housing are configured such that the first ferrules and the second ferrules corresponding to each other are connected to each other while the end surfaces of the first ferrules and the end surfaces of the second ferrules come into contact with each other. The optical connection structure further includes one or more first latch mechanisms, one or more second latch mechanisms, and one or more latch releasing mechanisms. The first latch mechanisms are configured to individually restrict the movements of the first inner housings relative to the first outer housing in a pullout direction. The second latch mechanisms are configured to individually couple the first inner housings and the second inner housings corresponding to each other. The latch releasing mechanisms are configured to release the first latch mechanisms of the first inner housings in a state where the first inner housings and the second inner housings are coupled to each other by the second latch mechanisms.

DESCRIPTION OF EMBODIMENTS

Figure 1:
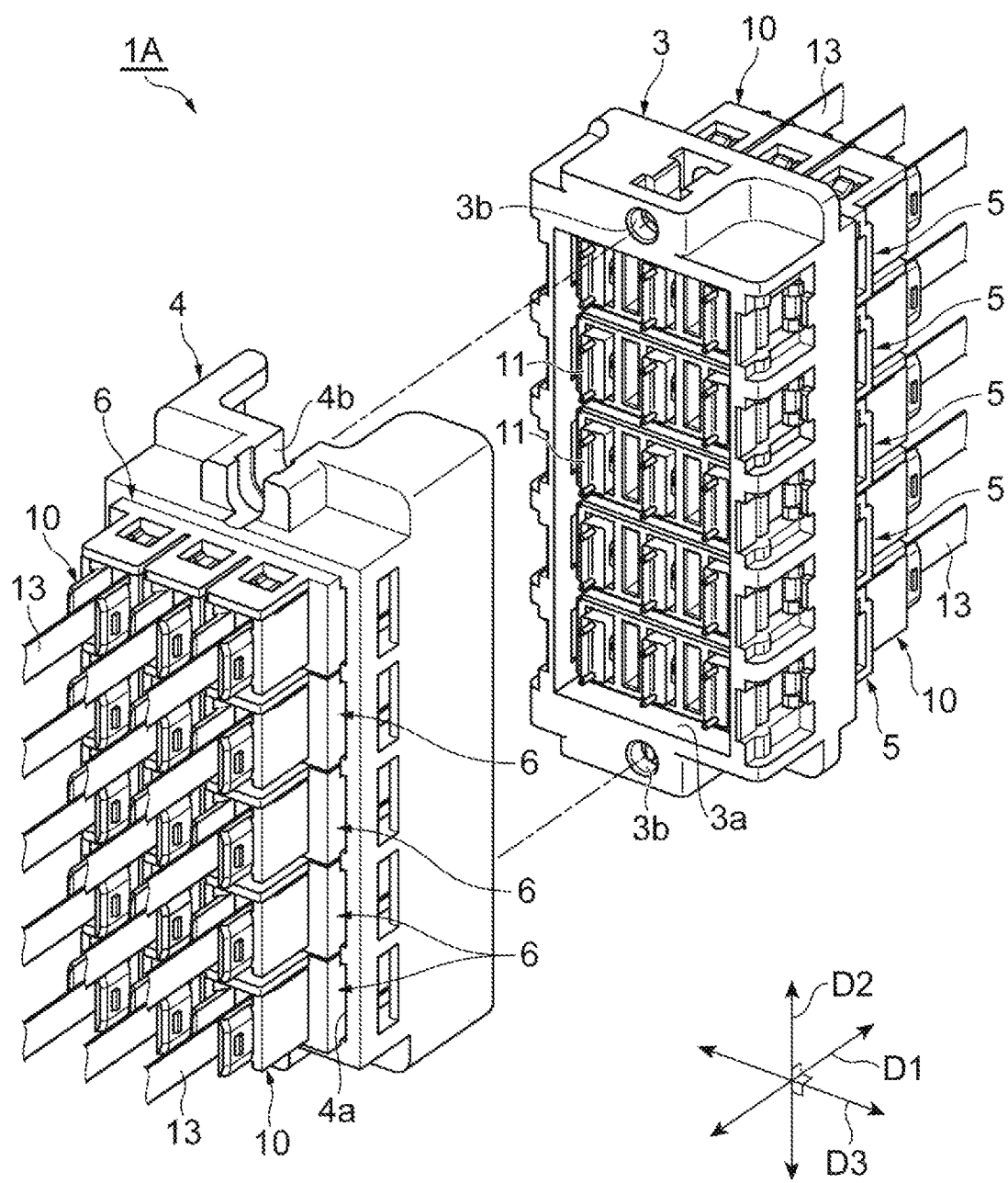
FIG. 1 is a perspective view illustrating an exterior of an optical connection structure according to one embodiment.

Problem to Be Solved by Present Disclosure

With an increase in the amount of telecommunication in recent years, optical connection structures where a plurality of optical fibers are collectively connected to each other have been developed. For example, in an optical connector disclosed in Patent Literature 1, an MT ferrule holding a plurality of optical fibers is exposed from an opening provided at a tip of the outer housing, and is connected to a corresponding ferrule by physical contact (PC). In order to connect a larger number of optical fibers to each other, it is required to collectively connect a large number of the MT ferrules to each other. Thus, it is considered that the large number of MT ferrules are collectively held by a single housing and the housing and a mating connection housing are fixed to each other.

In PC connection of optical fibers, the optical fibers are pressed against each other to maintain the optical coupling efficiency. For example, in the case of 12-core MT ferrules, the load to press the ferrules is, for example, 10 N to 20 N. Therefore, when a plurality of the ferrules are collectively connected to each other, the larger the number of the ferrules, the larger the required pressing load, and thus an excessive stress occurs in a fixing portion between the housings to destroy the fixing portion, which is a concern.

Effects of Present Disclosure

According to the present disclosure, an optical connection structure where stress generated in housings by PC connection is reduced is provided.

Description of Embodiments of Present Disclosure

Firstly, the contents of embodiments of the present disclosure will be listed and described. An optical connection structure according to one aspect of the present disclosure includes N first inner housings, a first outer housing, N second inner housings, and a second outer housing, where N is an integer of two or greater. Each of the first inner housings is configured to hold M first ferrules in a state where end surfaces of the first ferrules of which each holds an end portion of a first optical fiber extending along a first direction are exposed, where M is an integer of one or greater. The first outer housing holds the N first inner housings in a state of being arranged in a second direction intersecting the first direction. Each of the second inner housings is configured to hold M second ferrules in a state where end surfaces of the second ferrules of which each holds an end portion of a second optical fiber extending along the first direction are exposed. The second outer housing holds the N second inner housings in a state of being arranged in the second direction. The first outer housing and the second outer housing are configured such that the first ferrules and the second ferrules corresponding to each other are connected to each other while the end surfaces of the first ferrules and the end surfaces of the second ferrules come into contact with each other. The optical connection structure further includes one or more first latch mechanisms, one or more second latch mechanisms, and one or more latch releasing mechanisms. The first latch mechanisms are configured to individually restrict movements of the first inner housings relative to the first outer housing in a pullout direction. The second latch mechanisms are configured to individually couple the first inner housings and the second inner housings corresponding to each other. The latch releasing mechanisms are configured to release the first latch mechanisms of the first inner housings in a state where the first inner housings and the second inner housings are coupled to each other by the second latch mechanisms.

In the optical connection structure, (M×N) first ferrules held by the first outer housing and (M×N) second ferrules held by the second outer housing are PC connected to each other. In the optical connection structure, the first ferrules and the second ferrules are PC connected to each other in a state where the movements of the first inner housings relative to the first outer housing in the pullout direction are restricted by the first latch mechanisms. Then, the second latch mechanisms operate while a state of contact between the first ferrules and the second ferrules is maintained. Accordingly, the first ferrules and the second ferrules corresponding to each other are individually coupled to each other, so that a state of PC connection is maintained. Thereafter, while a state of the coupling is maintained, the latch releasing mechanisms release the first latch mechanisms to release the coupling between the first outer housing and the first inner housings. Accordingly, the N first inner housings are brought into a state of being floated with respect to the first outer housing.

According to the optical connection structure, after a series of connection operations, almost no (theoretically, not at all) load is applied to connection portions between the first outer housing and the second outer housing by the PC connection. Only M loads are applied to coupling portions (second latch mechanisms) between the first inner housings and the second inner housings by the PC connection. Therefore, according to the optical connection structure, it is possible to further reduce the stress which is generated in the housings by the PC connection, compared to when (M×N) loads are applied to the connection portions between the first outer housing and the second outer housing by the PC connection.

As one embodiment, when the first outer housing and the second outer housing are connected to each other, after the first latch mechanism of one first inner housing is released, another first inner housing and a corresponding second inner housing may be coupled to each other by the second latch mechanism. Accordingly, it is possible to disperse the loads over time which are applied to the first outer housing and the second outer housing until the first latch mechanisms are released.

As one embodiment, when the first outer housing and the second outer housing are connected to each other, after the first latch mechanism of one first inner housing positioned at a center in the second direction is released, other first inner housings positioned on both sides of the one first inner housing and corresponding second inner housings may be coupled to each other by the second latch mechanisms, and after the first latch mechanisms of the other first inner housings are released, still other first inner housings, which are positioned opposite to the one first inner housing positioned at the center with respect to the other first inner housings, and corresponding second inner housings may be coupled to each other by the second latch mechanisms. Accordingly, it is possible to more effectively disperse the loads over time which are applied to the first outer housing and the second outer housing until the first latch mechanisms are released.

As one embodiment, the one first inner housing and the other first inner housing may be alternately disposed in the second direction. In such a configuration, it is possible to disperse the loads over time which are applied to the first outer housing and the second outer housing until the first latch mechanisms are released.

As one embodiment, when the first outer housing and the second outer housing are connected to each other, after the first latch mechanism of an $n^{th}$ (n=1, ..., N−1) first inner housing is released, an $n+i^{th}$ first inner housing and a corresponding second inner housing may be coupled to each other by the second latch mechanism. Accordingly, it is possible to more effectively disperse the loads over time which are applied to the first outer housing and the second outer housing until the first latch mechanisms are released.

As one embodiment, the optical connection structure may further include the M first ferrules held by the first inner housing, and the M second ferrules held by the second inner housing. The number M of the first ferrules and of the second ferrules may be from three to five. For example, when the load required between the first ferrule and the second ferrule is 10 N to 20 N and the number M is five, the load applied to the coupling portions (second latch mechanisms) between the first inner housing and the second inner housing is 50 N to 100 N. In a case where this degree of load is applied, even when the coupling portions between the first inner housing and the second inner housing are made of a resin, the coupling portions are capable of sufficiently withstanding the load. The larger the number M, the more efficiently a large number of optical fibers can be collectively connected to each other, and thus it is desirable that the number M is, for example, three or greater.

As one embodiment, one inner housing of the first inner housing and the second inner housing may include a protruding portion protruding toward the other inner housing, and the other inner housing may include a hole into which the protruding portion is fitted. Accordingly, it is possible to relatively accurately position the first inner housing and the second inner housing.

As one embodiment, the first outer housing and the second outer housing may further include a fixing structure to fix the first outer housing and the second outer housing to each other. Accordingly, it is possible to suitably maintain an optical connection state after the first inner housing has been floated (has been in a state of floating).

As one embodiment, when the first outer housing and the second outer housing are detached from each other, in all of the first inner housings and the corresponding second inner housings, the second latch mechanisms may be released after the first latch mechanisms are coupled. Accordingly, it is possible to cause the optical connection structure to reliably return to a state before connection. Therefore, it is possible to connect the optical connection structure again according to the foregoing procedure.

As one embodiment, the first outer housing may further include a pair of contact surfaces facing each other in the first direction, the second inner housing may include a protrusion protruding between the pair of contact surfaces, and a range of a movement of the second inner housing in the first direction may be limited by a gap between the pair of contact surfaces. Accordingly, it is possible to stably maintain a state of floating of the first inner housing.

As one embodiment, the first latch mechanism may include a first engaging protrusion provided in the first inner housing, the first engaging protrusion extending along the first direction and being elastically deformable, and an opening provided in the first outer housing. The first engaging protrusion may be provided with a first hook structure that engages with the opening. The first hook structure may include a pair of hooks spaced apart from each other along the second direction. Each of the pair of hooks may extend outward along a third direction intersecting the first direction and the second direction.

As one embodiment, the second latch mechanism may include a second engaging protrusion provided in the first inner housing, and a third engaging protrusion provided in the second inner housing. The second engaging protrusion may engage with the third engaging protrusion. The second engaging protrusion may include a portion extending outward from a side surface of the first inner housing along a third direction intersecting the first direction and the second direction, and the third engaging protrusion may include a portion extending inward along the third direction. Each of the second engaging protrusion and the third engaging protrusion may include a surface intersecting the first direction. The third engaging protrusion may include an elastically deformable portion extending along the first direction, and a second hook structure that extends inside the second inner housing from the elastically deformable portion. The third engaging protrusion may further include a protrusion protruding outside the second inner housing from the elastically deformable portion.

As one embodiment, the latch releasing mechanism may include a first inclined surface provided in the first inner housing to work with the first latch mechanism and is inclined with respect to the first direction, and a second inclined surface provided in the second inner housing to work with the second latch mechanism and is inclined with respect to the first direction. The first inclined surface may be provided proximate to an engaging region in the first latch mechanism, and the second inclined surface may be provided proximate to an engaging region in the second latch mechanism. The latch releasing mechanism may be configured such that the first inclined surface and the second inclined surface separate from each other when the movement of the first inner housing relative to the first outer housing in the pullout direction is restricted by the first latch mechanism, and the first inclined surface and the second inclined surface come into contact with each other when the first latch mechanism is released by the latch releasing mechanism.

Detailed Description of Embodiments of Present Disclosure

Specific examples of an optical connection structure according to an embodiment of the present disclosure will be described with reference to the drawings. It is intended that the present invention is not limited to these examples and is implied by the claims and include all modifications within the concept and the scope equivalent to the claims. In the following description, the same reference signs will be assigned to the same components in the description of the drawings, and duplicate descriptions will be omitted. For descriptive purpose, a first direction D1, a second direction D2, and a third direction D3 intersecting (as an example, orthogonal to) each other are illustrated in each drawing.

FIG. 1 is a perspective view illustrating an exterior of an optical connection structure 1A according to one embodiment. The optical connection structure 1A includes a pair of outer housings 3 and 4. The outer housings 3 and 4 include, respectively, insertion holes 3a and 4a having central axes along the first direction D1. The cross-sectional shapes of the insertion holes 3a and 4a in a cross-section perpendicular to the first direction D1 are, for example, rectangular shapes. The outer housings 3 and 4 have a rectangular frame shape. The outer housings 3 and 4 are connected to each other and are fixed to each other. As one example, the outer housing 4 is provided with a pair of grooves 4b that accommodate bolts, and the outer housing 3 is provided with a pair of screw holes 3b that are screwed with the bolts. The pair of screw holes 3b and the pair of grooves 4b are disposed at one ends and the other ends of the outer housings 3 and 4 in the second direction D2. The screw holes 3b and the grooves 4b are one example of a fixing structure to fix the outer housings 3 and 4 to each other. The outer housings 3 and 4 may be fixed to each other by other structures.

The optical connection structure 1A further includes N inner housings 5 and the same number (N) of inner housings 6 as the inner housings 5, where N is an integer of two or greater and N=5 is provided as an example in the drawing. In a state where the N inner housings 5 are arranged along the second direction D2, the N inner housings 5 are collectively held in the insertion hole 3a by the outer housing 3. The inner housings 5 are collectively or individually inserted into the insertion hole 3a from behind the outer housing 3, that is, from the opposite side to the outer housing 4. Similarly, in a state where the N inner housings 6 are arranged along the second direction D2, the N inner housings 6 are collectively held in the insertion hole 4a by the outer housing 4. The inner housings 6 are collectively or individually inserted into the insertion hole 4a from behind the outer housing 4, that is, from the opposite side to the outer housing 3.

Each of the inner housings 5 holds M ferrules 11 in a state where end surfaces of the ferrules 11 are exposed, where M is an integer of one or greater and M=3 is provided as an example in the drawing. Each of the inner housings 6 holds the same number (M) of the ferrules 11 (to be described later and refer to FIG. 4) as the ferrules 11 in a state where end surfaces of the ferrules 11 are exposed. The outer housing 3 and the outer housing 4 connect the M ferrules 11 of each of the inner housings 5 and the M ferrules 11 of each of the inner housings 6 to each other while causing the end surfaces of the respective M ferrules 11 and the end surfaces of the respective M ferrules 11 to come into contact with each other. The suitable number M of the ferrules 11 may be from three to five.

Figure 2:
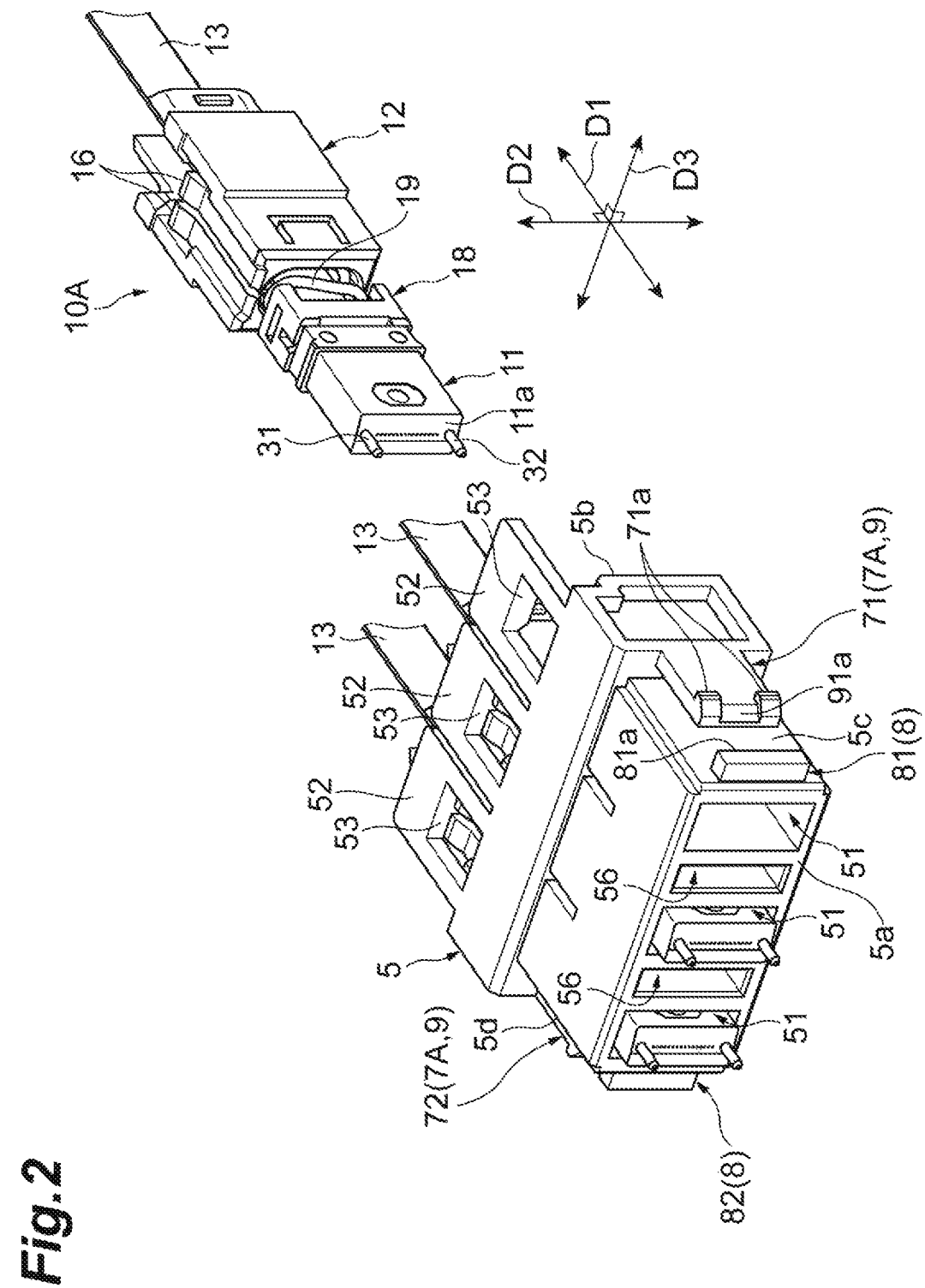
FIG. 2 is an exploded perspective view illustrating in detail the structure of an inner housing and optical connector components inserted into and held by the inner housing.

FIG. 2 is an exploded perspective view illustrating in detail the structure of the inner housing 5 and optical connector components 10A that are inserted into and held by the inner housing 5. The inner housing 5 includes M insertion holes 51 into which the optical connector components 10A are respectively inserted along the first direction D1. The insertion holes 51 at both ends are formed alongside the insertion hole 51 at the center in the second direction D2, and have the same structure as that of the insertion hole 51 at the center. The inner housing 5 accommodates and holds the optical connector components 10A, and end surfaces 11a of the ferrules 11 of the optical connector components 10A are exposed from a front end surface 5a of the inner housing 5. The M ferrules 11 are PC connected via the end surfaces 11a to the M ferrules 11 held by the inner housing 6 that is connected to and corresponds to (mates with) the inner housing 5.

Each of the optical connector component 10A includes the ferrule 11, a pin keeper 18, a compression coil spring 19, and a rear housing 12, and these sub-components are arranged along the first direction D1. The ferrule 11 is made of, for example, a resin, and holds an end portion of an optical fiber 13 extending along the first direction D1. The optical fiber 13 is, for example, a tape fiber in which a plurality of bare optical fibers are arranged along the second direction D2. The ferrule 11 is, for example, an MT ferrule and has a substantially rectangular parallelepiped-shaped exterior. The ferrule 11 includes the front end surface 11a facing forward in the first direction D1. Respective end surfaces of glass fibers forming the optical fiber 13 are exposed from the front end surface 11a.

The ferrule 11 further includes a pair of through-holes through which a pair of pins 31 and 32 made of a metal for positioning the ferrule 11 of the inner housing 6 are inserted. The pin keeper 18 holds rear ends of the pair of pins 31 and 32, and is provided in contact with a rear end surface of the ferrule 11, namely, an end surface of the ferrule 11 which is proximate to the rear housing 12 in the first direction D1. The pin keeper 18 is made of, for example, a resin, and includes a through-hole through which the optical fiber 13 is inserted.

The compression coil spring 19 is disposed so as to align its central axis with the first direction D1, and couples the rear housing 12 to the ferrule 11 while accommodating the optical fiber 13 thereinside. A front end of the compression coil spring 19 is enfolded and held by the pin keeper 18, and a rear end of the compression coil spring 19 is enfolded and held by the rear housing 12. The compression coil spring 19 biases the rear housing 12 rearward (pullout direction of the optical connector component 10A with respect to the inner housing 5) in a state where the optical connector component 10A is inserted into the inner housing 5.

The rear housing 12 includes a through-hole through which the optical fiber 13 is inserted, and is coupled to the ferrule 11 via the pin keeper 18 and the compression coil spring 19. The rear housing 12 further includes an engaging structure 16. The engaging structure 16 faces toward an opposite side to a direction toward the insertion hole 51, in other words, an opposite side to a direction toward the ferrule 11, namely, rearward. The engaging structure 16 has, for example, a planar shape perpendicular to the first direction D1.

The inner housing 5 has a substantially rectangular parallelepiped-shaped exterior, and includes the front end surface 5a and a rear end surface 5b facing each other in the first direction D1, and a pair of side surfaces 5c and 5d facing each other in the third direction D3. The M insertion holes 51 are formed to be arranged along the third direction D3, and each of the insertion holes 51 extends along the first direction D1. In other words, the central axis of each of the insertion holes 51 is positioned along the first direction D1. The shape of each of the insertion holes 51 in a cross-section perpendicular to the first direction D1 is a rectangular shape having the third direction D3 as a transverse direction and the second direction D2 as a longitudinal direction. Each of the insertion holes 51 penetrates through the inner housing 5 from the front end surface 5a to the rear end surface 5b. The respective ferrules 11 of the optical connector components 10A are exposed outside the inner housing 5 from respective openings of the insertion holes 51 in the front end surface 5a (refer to FIG. 1). Respective rear portions of the rear housings 12 extend outside the inner housing 5 from respective openings of the insertion holes 51 in the rear end surface 5b.

The inner housing 5 includes M eaves 52 of which each is elastically deformable and protrudes along the first direction D1 from an edge of the opening of the insertion hole 51 in the rear end surface 5b. The eave 52 protrudes from the edge, which is at an upper end in the second direction D2, among edges surrounding the opening. The eave 52 includes an engaging structure 53. The engaging structure 53 is provided in the vicinity of a rear end of the eave 52 in the first direction D1, and protrudes toward the rear housing 12. The engaging structure 53 engages with the engaging structure 16 of the rear housing 12. The engaging structure 53 faces toward the insertion hole 51, in other words, the ferrule 11, namely, forward. The engaging structure 53 has a planar shape perpendicular to the first direction D1. The engaging structure 53 is in contact with the engaging structure 16 in a state where the optical connector component 10A is inserted into the insertion hole 51. In this case, since the rear housing 12 is biased rearward by the compression coil spring 19, a state of engagement between the engaging structure 53 and the engaging structure 16 is stably held.

The inner housing 5 further includes holes 56 provided in the front end surface 5a. Each of the holes 56 is formed between the insertion holes 51 adjacent to each other. In other words, the insertion holes 51 and the holes 56 are alternately formed in the front end surface 5a along the third direction D3. The hole 56 extends rearward from the front end surface 5a in the first direction D1 serving as a depth direction. The cross-sectional shape of the hole 56 which is perpendicular to the depth direction is, for example, a rectangular shape having the second direction D2 as a longitudinal direction. The length of the hole 56 in the second direction D2 is equal to the length of the insertion hole 51 in the same direction.

Figure 3:
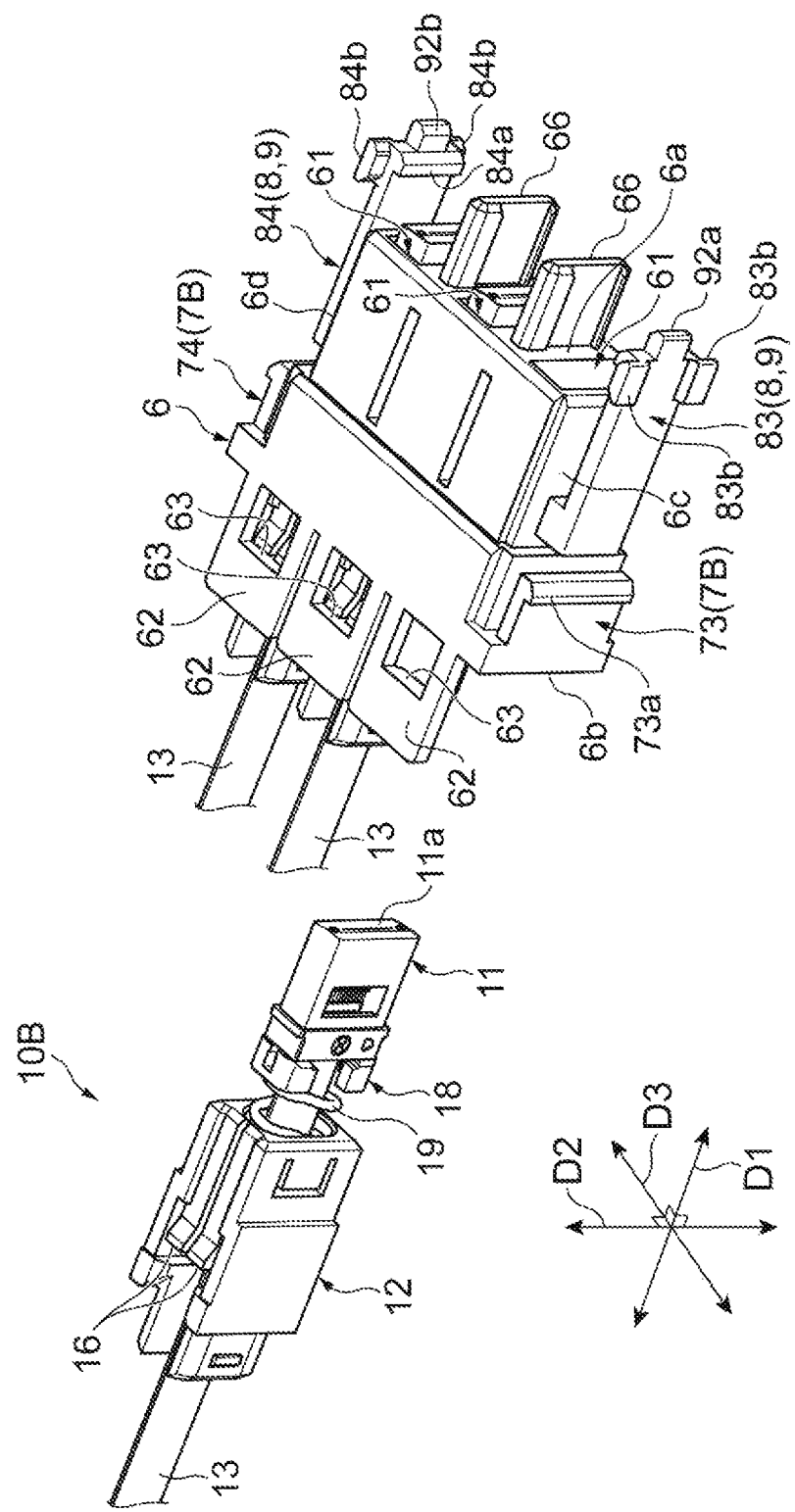
FIG. 3 is an exploded perspective view illustrating in detail the structure of an inner housing corresponding to the inner housing of FIG. 2 and optical connector components inserted into and held by the inner housing.
Figure 4:
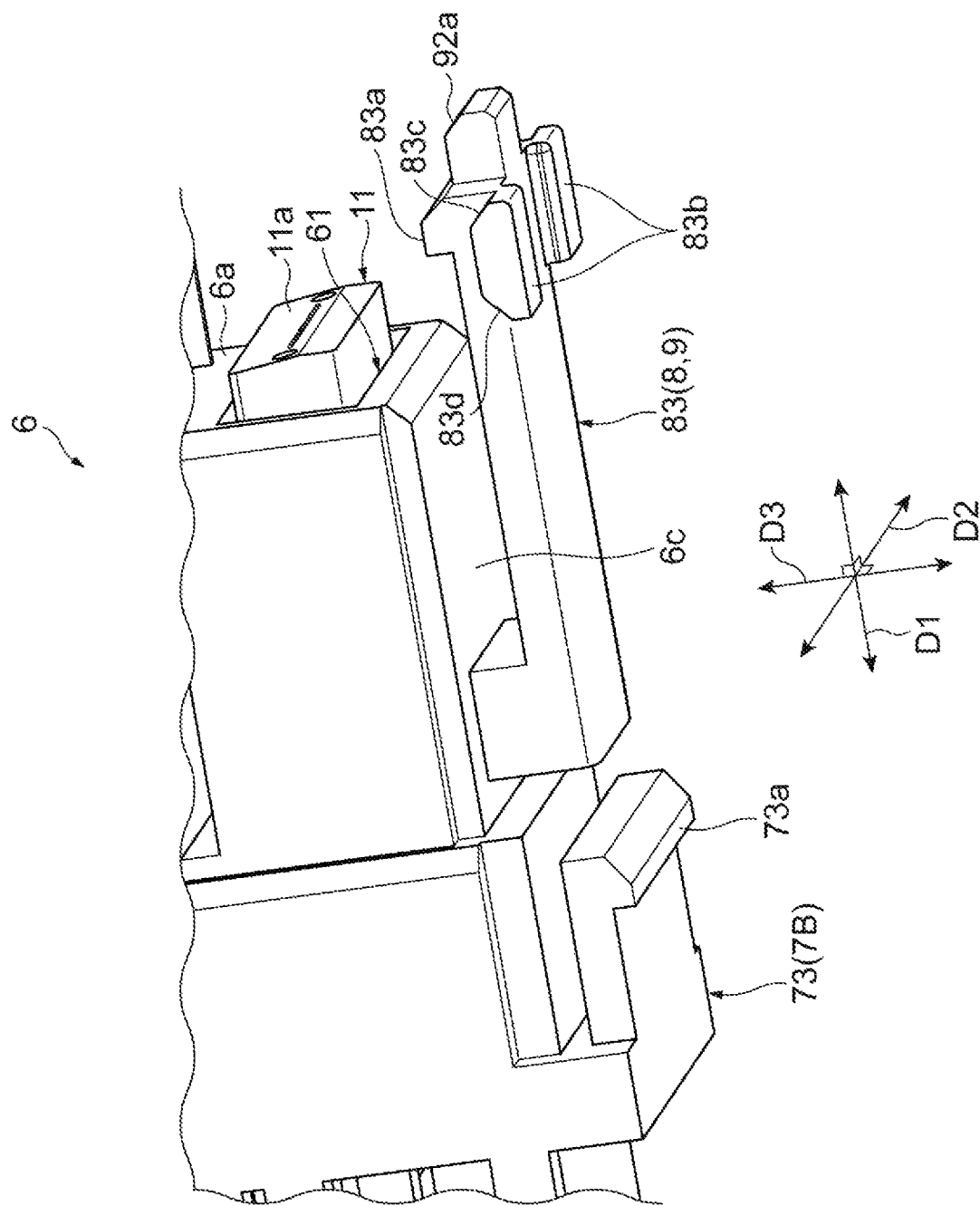
FIG. 4 is a perspective view illustrating an enlargement of a part of the inner housing illustrated in FIG. 3.

FIG. 3 is an exploded perspective view illustrating in detail the structure of the inner housing 6 and optical connector components 10B that are inserted into and held by the inner housing 6. FIG. 4 is a perspective view illustrating an enlargement of a part of the inner housing 6. Except that the optical connector component 10B does not include the pins 31 and 32, the configuration of the optical connector component 10B is the same as that of the optical connector component 10A described above.

The inner housing 6 includes M insertion holes 61 into which the optical connector components 10B are inserted along the first direction D1. The insertion holes 61 at both ends are formed alongside the insertion hole 61 at the center in the third direction D3, and have the same structure as that of the insertion hole 61 at the center. The inner housing 6 accommodates and holds M optical connector components 10B, and the end surfaces 11a of the ferrules 11 of the optical connector components 10B are exposed from a front end surface 6a of the inner housing 6.

The inner housing 6 has a substantially rectangular parallelepiped-shaped exterior, and includes the front end surface 6a and a rear end surface 6b facing each other in the first direction D1, and a pair of side surfaces 6c and 6d facing each other in the third direction D3. A plurality of the insertion holes 61 are formed to be arranged along the third direction D3, and each of the insertion holes 61 extends along the first direction D1. In other words, the central axis of each of the insertion holes 61 is positioned along the first direction D1. The shape of each of the insertion holes 61 in a cross-section perpendicular to the first direction D1 is a rectangular shape having the third direction D3 as a transverse direction and the second direction D2 as a longitudinal direction.

Each of the insertion holes 61 penetrates through the inner housing 6 from the front end surface 6a to the rear end surface 6b. The respective ferrules 11 of the optical connector components 10B are exposed outside the inner housing 6 from respective openings of the insertion holes 61 in the front end surface 6a. Respective rear portions of the rear housings 12 extend outside the inner housing 6 from respective openings of the insertion holes 61 in the rear end surface 6b.

The inner housing 6 includes M eaves 62 of which each is elastically deformable and protrudes along the first direction D1 from an edge of the opening of the insertion hole 61 in the rear end surface 6b. The eave 62 protrudes from the edge, which is on an upper end side in the second direction D2, among edges surrounding the opening. The eave 62 includes an engaging structure 63. The engaging structure 63 is provided in the vicinity of a rear end of the eave 62 in the first direction D1, and protrudes toward the rear housing 12. The engaging structure 63 engages with the engaging structure 16 of the rear housing 12. The engaging structure 63 faces toward the insertion hole 61, in other words, the ferrule 11, namely, forward. The engaging structure 63 has a planar shape perpendicular to the first direction D1. The engaging structure 63 is in contact with the engaging structure 16 in a state where the optical connector component 10B is inserted into the insertion hole 61. In this case, since the rear housing 12 is biased rearward by the compression coil spring 19, a state of engagement between the engaging structure 63 and the engaging structure 16 is stably held.

The inner housing 6 includes protrusions 66, which protrude toward the inner housing 5, that is, forward in the first direction D1, on the front end surface 6a. When the inner housings 5 and 6 are coupled to each other, the protrusions 66 are fitted into the holes 56 of the inner housing 5. The protrusion 66 is formed between the insertion holes 61 adjacent to each other. In other words, the insertion holes 61 and the protrusions 66 are alternately formed in the front end surface 6a along the third direction D3. The cross-sectional shape of the protrusion 66 which is perpendicular to a protrusion direction has the second direction D2 as a longitudinal direction. The length of the protrusion 66 in the second direction D2 is equal to the length of the insertion hole 61 in the same direction.

In the present embodiment, as described above, the inner housing 5 includes the holes 56 and the inner housing 6 includes the protrusions 66; however, the inner housing 5 may include protrusions and the inner housing 6 may include holes into which the protrusions are fitted.

Next, a latch mechanism which causes the inner housing 5 and the inner housing 6 to engage with the outer housing 3 and the outer housing 4, respectively, and a latch mechanism which causes the inner housing 5 to engage with the inner housing 6 will be described. As illustrated in FIG. 2, the inner housing 5 further includes a pair of engaging protrusions 71 and 72 and a pair of engaging protrusions 81 and 82. The engaging protrusions 71 and 81 are provided on one side surface 5c. The engaging protrusions 72 and 82 are provided on the other side surface 5d. As illustrated in FIGS. 3 and 4, the inner housing 6 further includes a pair of engaging protrusions 73 and 74 and a pair of engaging protrusions 83 and 84. The engaging protrusions 73 and 83 are provided on one side surface 6c. The engaging protrusions 74 and 84 are provided on the other side surface 6d.

The engaging protrusions 71 and 72 illustrated in FIG. 2 form a part of a latch mechanism 7A. The respective latch mechanisms 7A are mechanisms that individually restrict the movement of each of the inner housings 5 relative to the outer housing 3 in a pullout direction of the inner housing 5. The engaging protrusions 71 and 72 are elastically deformable portions that are provided in the inner housing 5 to protrude forward in the first direction D1. The engaging protrusions 71 and 72 include base ends that are respectively fixed to the side surfaces 5c and 5d, and tips that are free ends. The tip of the engaging protrusion 71 is provided with a hook 71a that engages with an opening formed in a side wall of the insertion hole 3a of the outer housing 3. A front surface of the hook 71a is inclined with respect to the first direction D1. A rear surface of the hook 71a faces rearward and is perpendicular to the first direction D1. The engaging protrusion 72 has the same shape as that of the engaging protrusion 71.

The engaging protrusions 73 and 74 illustrated in FIGS. 3 and 4 form a part of a latch mechanism 7B. The respective latch mechanisms 7B are mechanisms that individually restrict the movement of each of the inner housings 6 relative to the outer housing 4 in a pullout direction of the inner housing 6. The engaging protrusions 73 and 74 are elastically deformable portions that are provided in the inner housing 6 to protrude forward in the first direction D1. The engaging protrusions 73 and 74 include base ends that are respectively fixed to the side surfaces 6c and 6d, and tips that are free ends. The tip of the engaging protrusion 73 is provided with a hook 73a that engages with an opening formed in a side wall of the insertion hole 4a of the outer housing 4. A front surface of the hook 73a is inclined with respect to the first direction D1. A rear surface of the hook 73a faces rearward and is perpendicular to the first direction D1. The engaging protrusion 74 includes the same hook as the hook 73a.

The engaging protrusions 81 to 84 form a latch mechanism 8. The latch mechanisms 8 individually couple the respective inner housings 5 to the respective corresponding inner housings 6. The engaging protrusions 81 and 82 protrude, respectively, from the side surfaces 5c and 5d of the inner housing 5 outward in the third direction D3. The engaging protrusion 81 is provided on the side surface 5c in front of the engaging protrusion 71, namely, between the engaging protrusion 71 and the front end surface 5a. The engaging protrusion 82 is provided on the side surface 5d in front of the engaging protrusion 72, namely, between the engaging protrusion 72 and the front end surface 5a. The engaging protrusion 81 includes an engaging surface 81a that engages with the engaging protrusion 83 of the inner housing 6 which will be described later. The engaging surface 81a faces rearward and is perpendicular to the first direction D1. The engaging protrusion 82 also includes an engaging surface 82a (refer to FIG. 5) that is similar to the engaging surface 81a and engages with the engaging protrusion 84 of the inner housing 6 which will be described later.

The engaging protrusions 83 and 84 are elastically deformable portions that are provided in the inner housing 6 to protrude forward in the first direction D1. The engaging protrusions 83 and 84 include base ends that are respectively fixed to the side surfaces 6c and 6d, and tips that are free ends. The tip of the engaging protrusion 83 is provided with a hook 83a (refer to FIG. 4) that engages with the engaging surface 81a of the engaging protrusion 81 illustrated in FIG. 2. Similarly, a tip portion of the engaging protrusion 84 is provided with a hook 84a (refer to FIG. 3) that engages with the engaging surface 82a of the engaging protrusion 82. Front surfaces of the hooks 83a and 84a are inclined with respect to the first direction D1. Rear surfaces of the hooks 83a and 84a face rearward and are perpendicular to the first direction D1.

The engaging protrusions 71 and 72 and the engaging protrusions 83 and 84 further form a latch releasing mechanism 9. The respective latch releasing mechanisms 9 are mechanisms that release the respective latch mechanism 7A of the inner housing 5 in a state where the respective inner housing 5 and the respective inner housing 6 are coupled to each other by the latch mechanism 8. As illustrated in FIG. 2, an inclined surface 91a which is a part of the latch releasing mechanism 9 is formed alongside the hook 71a at the tip of the engaging protrusion 71. The inclined surface 91a is inclined with respect to the first direction D1, and an inclination direction of the inclined surface 91a is the same as that of the front surface of the hook 71a. The inclined surface 91a is provided at the center of the tip of the engaging protrusion 71 in the second direction D2, and divides the hook 71a into two portions. An inclined surface 91b (refer to FIG. 5) which is similar to the inclined surface 91a is formed also in the engaging protrusion 72.

As illustrated in FIGS. 3 and 4, the engaging protrusions 83 and 84 include protrusions that protrude further forward from the tips of the engaging protrusions 83 and 84. A front end of the protrusion of the engaging protrusion 83 is provided with an inclined surface 92a that is inclined with respect to the first direction D1. The inclined surface 92a forms a part of the latch releasing mechanism 9. When the outer housings 3 and 4 are connected to each other, the inclined surface 92a comes into contact with the inclined surface 91a (refer to FIG. 2) of the engaging protrusion 71 to bend the engaging protrusion 71 in a latch releasing direction. Similarly, a front end of the protrusion of the engaging protrusion 84 is provided with an inclined surface 92b that is inclined with respect to the first direction D1. When the outer housings 3 and 4 are connected to each other, the inclined surface 92b comes into contact with the inclined surface 91b of the engaging protrusion 72 to bend the engaging protrusion 72 in the latch releasing direction.

Next, an operation of the optical connection structure 1A will be described. Firstly, the N inner housings 5 are inserted into the insertion hole 3a of the outer housing 3. In parallel with the foregoing insertion, the N inner housings 6 are inserted into the insertion hole 4a of the outer housing 4.

Figure 5:
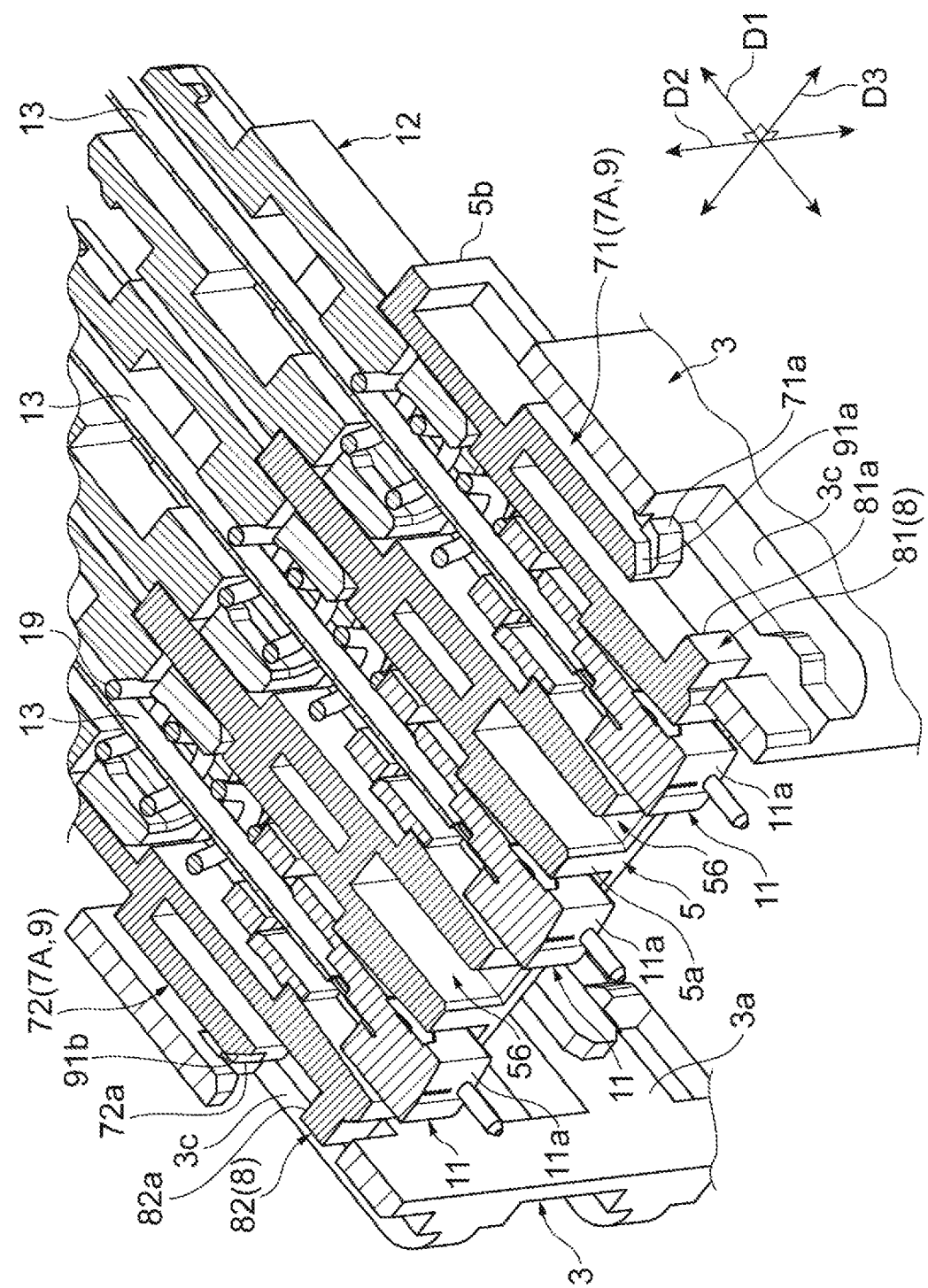
FIG. 5 is a cutaway perspective view illustrating a state where the inner housing illustrated in FIG. 2 has been inserted into an insertion hole of an outer housing.

FIG. 5 is a cutaway perspective view illustrating a state where the inner housing 5 has been inserted into the insertion hole 3a of the outer housing 3. When the inner housing 5 is inserted into the insertion hole 3a, firstly, the front surfaces of the hooks 71a and 72a of the engaging protrusions 71 and 72 come into contact with edges of the insertion hole 3a, so that the engaging protrusions 71 and 72 are elastically bent and the hooks 71a and 72a move toward the center of the inner housing 5 in the third direction D3. Accordingly, the engaging protrusions 71 and 72 can be inserted into the insertion hole 3a. Subsequently, when the inner housing 5 is inserted more deeply into the insertion hole 3a, so that the hooks 71a and 72a of the engaging protrusions 71 and 72 reach an opening 3c formed in the side wall of the outer housing 3, elastically deformed states of the engaging protrusions 71 and 72 are released and the hooks 71a and 72a move outside the inner housing 5 in the third direction D3 to engage with an inner surface of the opening 3c. Through the foregoing operation, the latch mechanism 7A serves to prevent the inner housing 5 from unintentionally being pulled out from the insertion hole 3a.

Figure 6:
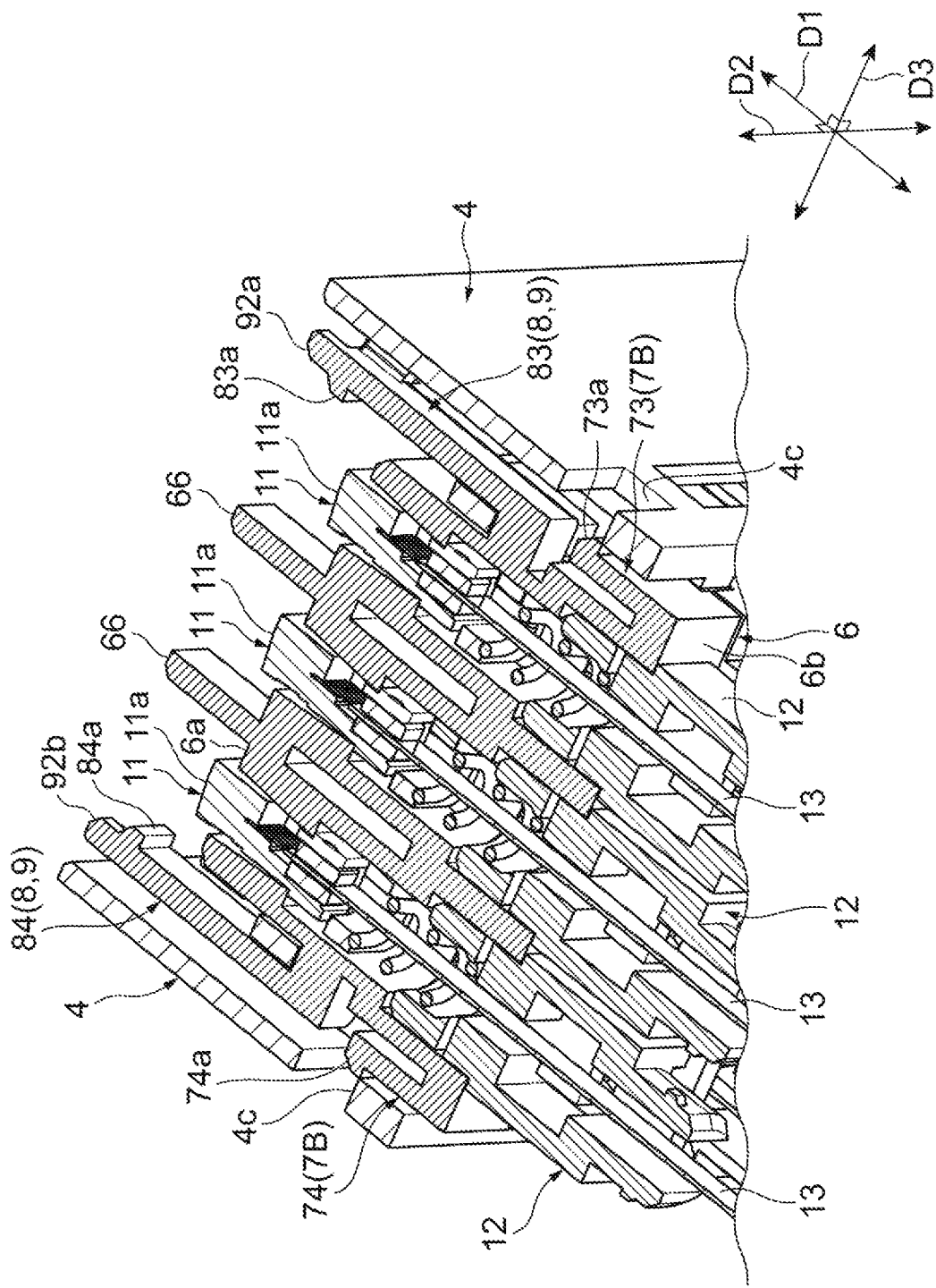
FIG. 6 is a cutaway perspective view illustrating a state where the inner housing illustrated in FIG. 3 has been inserted into an insertion hole of an outer housing.

FIG. 6 is a cutaway perspective view illustrating a state where the inner housing 6 has been inserted into the insertion hole 4a of the outer housing 4. When the inner housing 6 is inserted into the insertion hole 4a, firstly, the front surfaces of the hooks 73a and 74a of the engaging protrusions 73 and 74 come into contact with edges of the insertion hole 4a, so that the engaging protrusions 73 and 74 are elastically bent and the hooks 73a and 74a move toward the center of the inner housing 6 in the third direction D3. Accordingly, the engaging protrusions 73 and 74 can be inserted into the insertion hole 4a. Subsequently, when the inner housing 6 is inserted more deeply into the insertion hole 4a, so that the hooks 73a and 74a of the engaging protrusions 73 and 74 reach an opening 4c formed in the side wall of the outer housing 4, elastically deformed states of the engaging protrusions 73 and 74 are released and the hooks 73a and 74a move outside the inner housing 6 in the third direction D3 to engage with an inner surface of the opening 4c. Through the foregoing operation, the latch mechanism 7B serves to prevent the inner housing 6 from unintentionally being pulled out from the insertion hole 4a.

Figure 7:
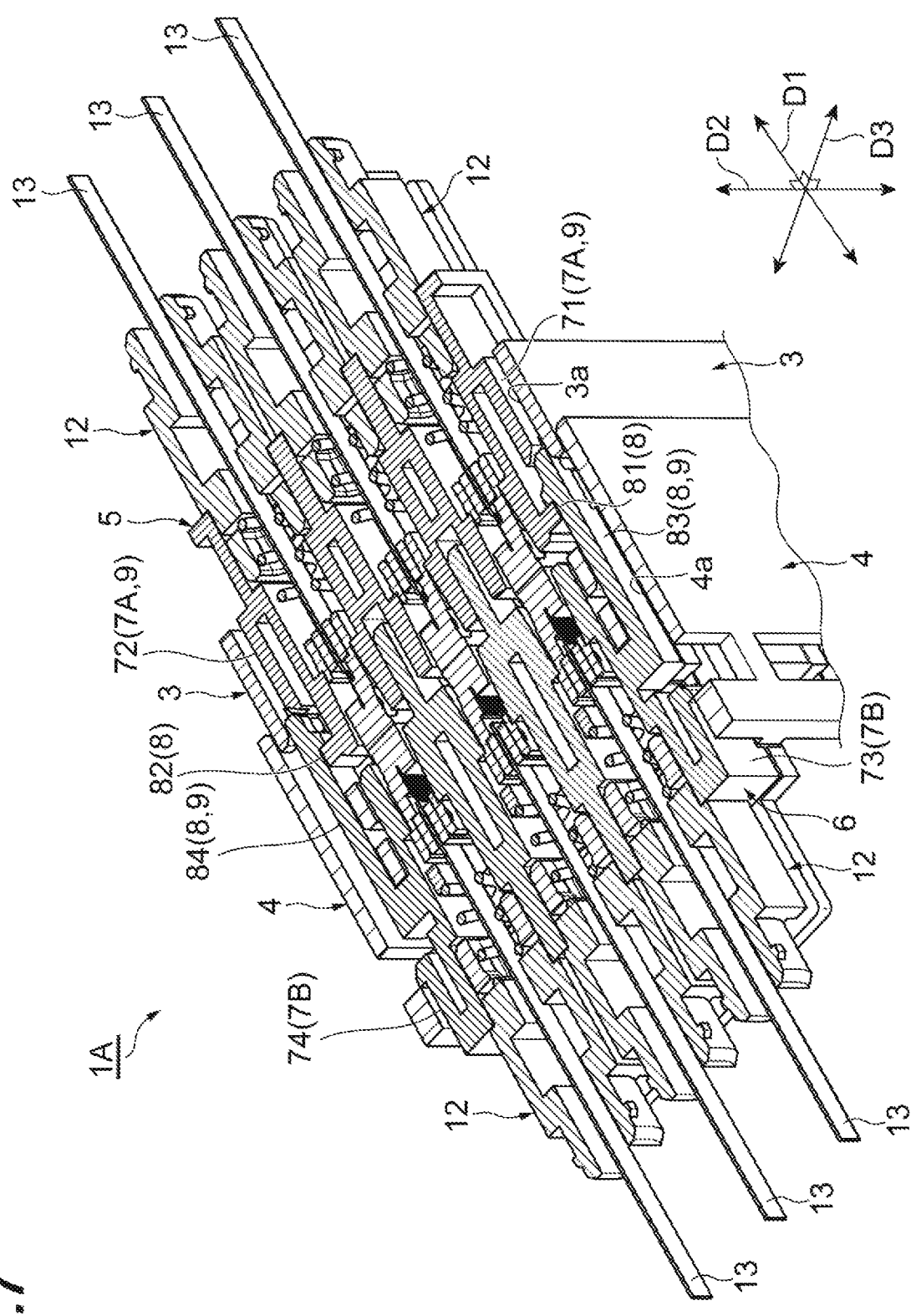
FIG. 7 is a cutaway perspective view illustrating a state where two outer housings have been connected to each other.
Figure 8:
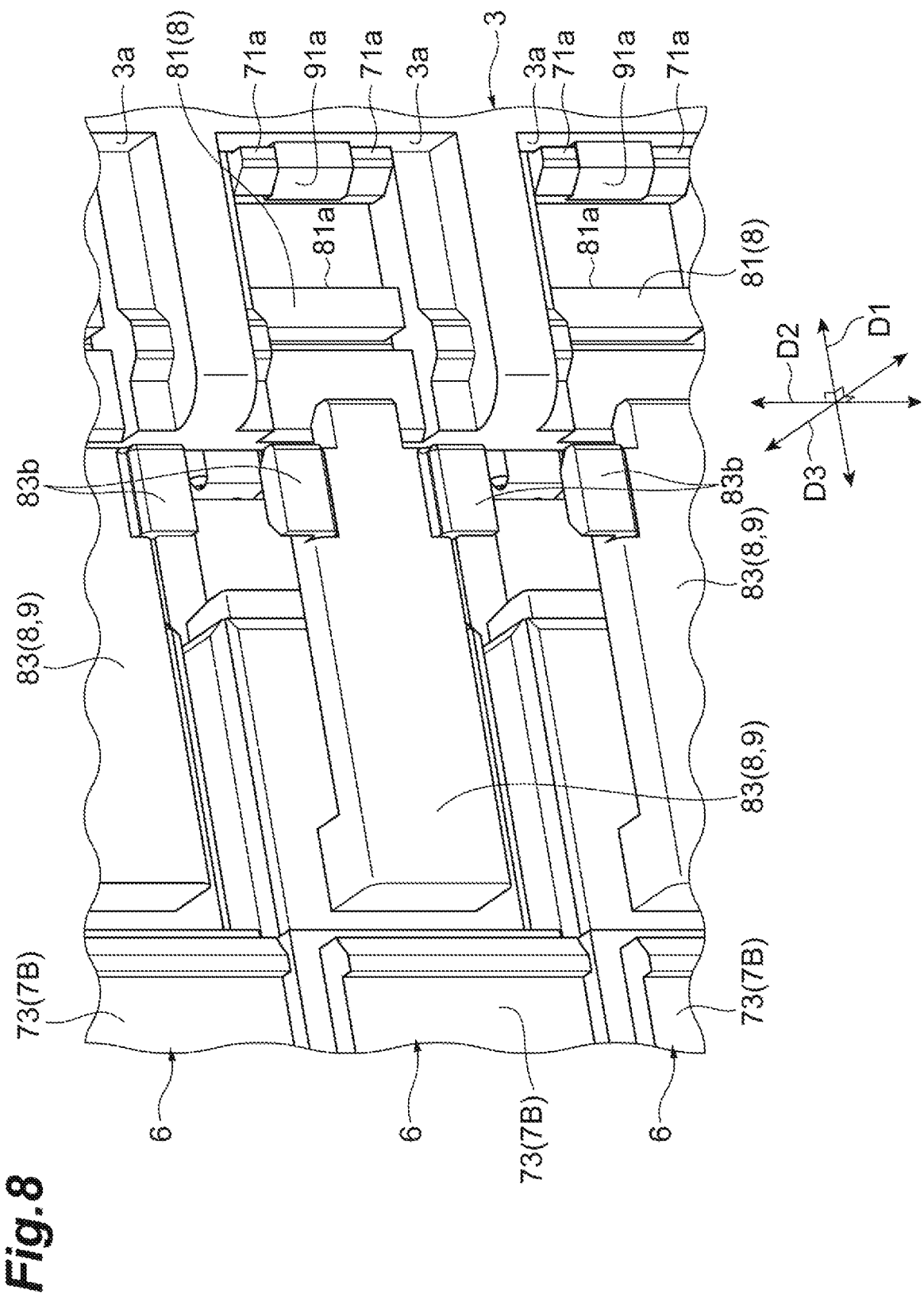
FIG. 8 is a view illustrating an operation when the two outer housings are connected to each other.
Figure 9:
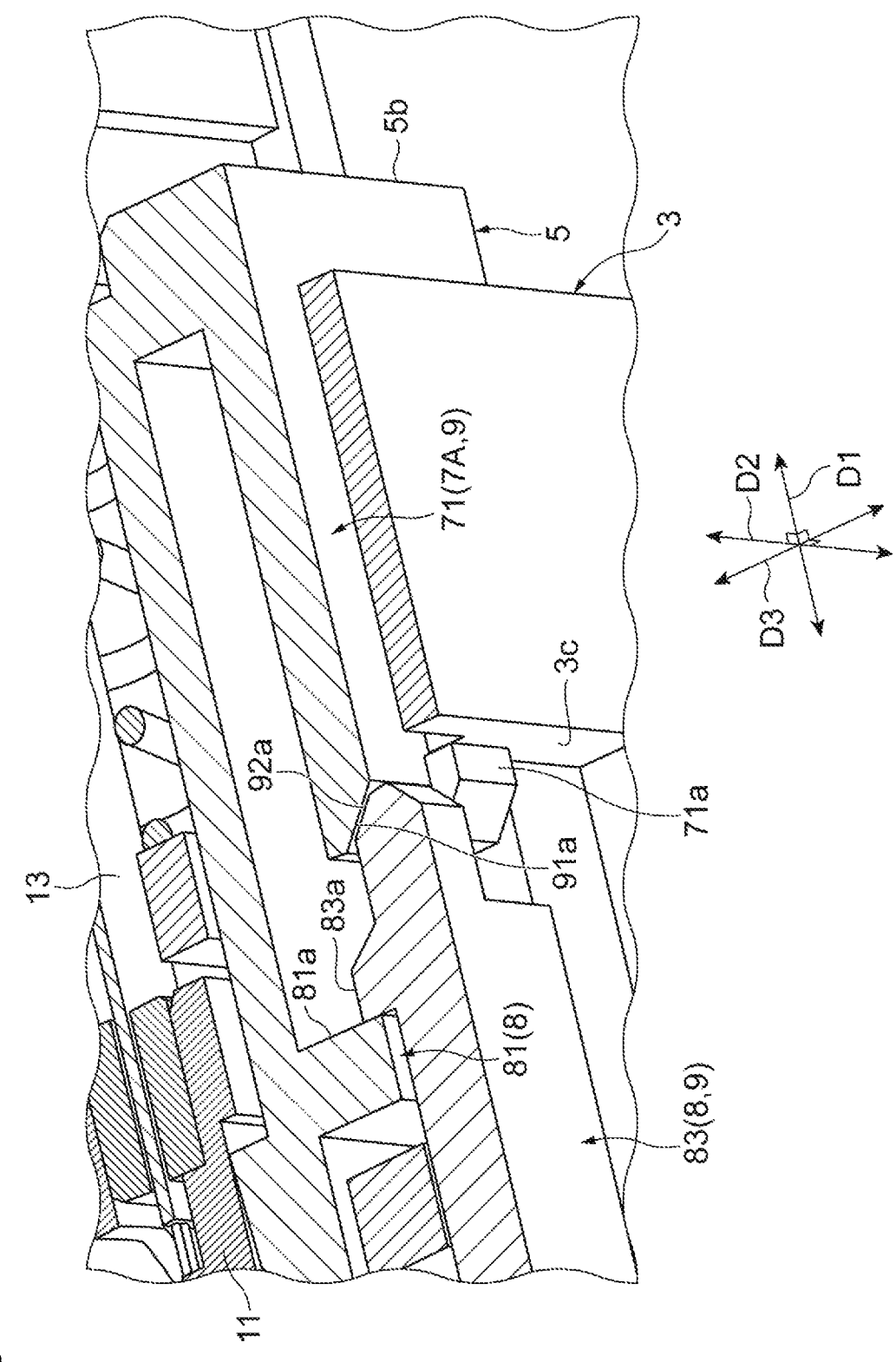
FIG. 9 is a view illustrating the operation when the two outer housings are connected to each other.
Figure 10:
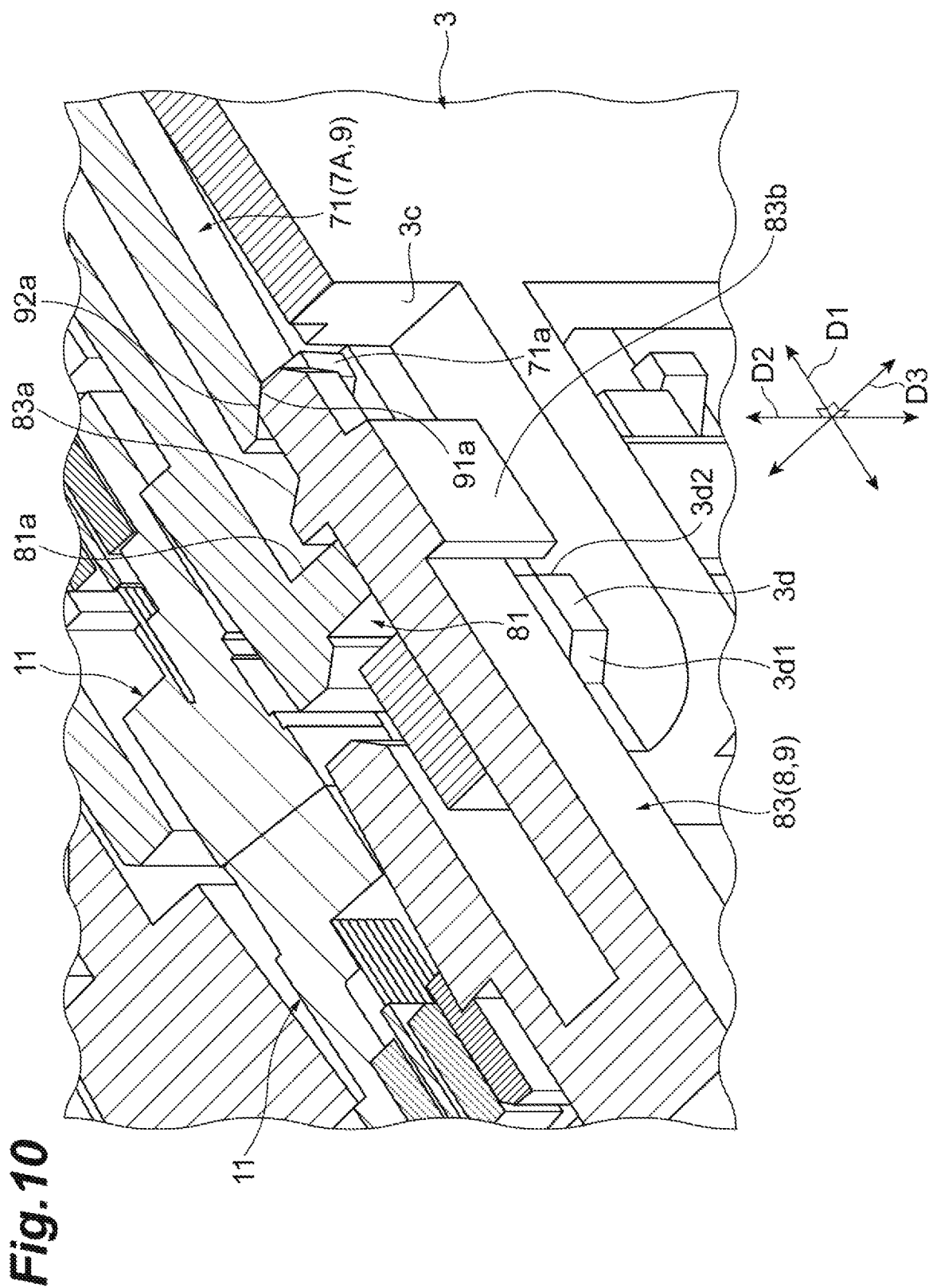
FIG. 10 is a view illustrating the operation when the two outer housings are connected to each other.

Subsequently, the outer housing 3 holding the N inner housings 5 and the outer housing 4 holding the N inner housings 6 are connected to each other. FIG. 7 is a cutaway perspective view illustrating a state where the outer housing 3 and the outer housing 4 have been connected to each other. FIGS. 8 to 10 are views illustrating an operation when the outer housing 3 and the outer housing 4 are connected to each other.

When this connection is performed, firstly, in a state where the end surfaces 11a of the ferrules 11 of the outer housing 3 and the end surfaces 11a of the corresponding ferrules 11 of the outer housing 4 face each other, the outer housing 3 and the outer housing 4 are fitted into each other. At this time, as illustrated in FIG. 8, the engaging protrusions 83 and 84 of the inner housing 6 and the engaging protrusions 81 and 82 of the inner housing 5 approach each other.

When the outer housing 3 and the outer housing 4 are fitted more deeply into each other thereafter, the end surfaces 11a of the ferrules 11 of the outer housing 3 and the outer housing 4 come into contact with each other, and while the compression coil springs 19 thereof are compressed to bias the ferrules 11 thereof in an opposing direction, the distance between the inner housings 5 and 6 is further reduced. Then, the front surfaces of the hooks 83a and 84a of the engaging protrusions 83 and 84 come into contact with the engaging protrusions 81 and 82, so that the engaging protrusions 83 and 84 are elastically bent and the hooks 83a and 84a move outside the inner housing 6 in the third direction D3. Accordingly, the hooks 83a and 84a are capable of climbing over the engaging protrusions 81 and 82. When the distance between the inner housings 5 and 6 is further reduced, as illustrated in FIG. 9, elastically deformed states of the engaging protrusions 83 and 84 are released and the hooks 83a and 84a move toward a center of the inner housing 6 in the third direction D3, so that the rear surfaces of the hooks 83a and 84a and the engaging surfaces 81a and 82a of the engaging protrusions 81 and 82 engage with each other. Through the foregoing operation, the latch mechanism 8 serves to cause the inner housing 5 and the inner housing 6 to be coupled to each other and to hold a state of PC connection between the ferrules 11.

Subsequently, when the outer housing 3 and the outer housing 4 are fitted further deeply into each other, the hooks 83a and 84a and the engaging surfaces 81a and 82a separate from each other, and the inclined surfaces 92a and 92b of the tips of the engaging protrusions 83 and 84 come into contact with the inclined surfaces 91a and 91b of the engaging protrusions 71 and 72. Namely, a length from the rear surface of the hook 83a to the inclined surface 92a in the inner housing 6 is shorter than a length from the engaging surface 81a to the inclined surface 91a in the inner housing 5. Similarly, a length from the rear surface of the hook 84a to the inclined surface 92b in the inner housing 6 is shorter than a length from the engaging surface 82a to the inclined surface 91b in the inner housing 5. Then, when the outer housing 3 and the outer housing 4 are fitted more deeply into each other against the biasing forces of the compression coil springs 19, as illustrated in FIG. 10, the engaging protrusions 83 and 84 press the inclined surfaces 91a and 91b, so that the engaging protrusions 71 and 72 are elastically bent and the hooks 71a and 72a move toward the center of the inner housing 6 in the third direction D3. Accordingly, a state of engagement between the hooks 71a and 72a and the inner surface of the opening 3c is released and the coupling between the outer housing 3 and the inner housing 5 is released; and thereby, bringing the inner housing 5 into a state of being floated with respect to the outer housing 3. Therefore, the biasing forces of the compression coil springs 19 are applied, so that the inner housing 5 moves rearward with respect to the outer housing 3.

As illustrated in FIG. 10, a pair of protrusions 3d (only one side is illustrated) are formed on the side wall of the outer housing 3. The cross-sectional shape of the protrusion 3d along a plane defined by the first direction D1 and the third direction D3 is a trapezoidal shape. The protrusion 3d includes a pair of inclined surfaces 3d1 and 3d2 that are inclined with respect to the first direction D1. The inclined surface 3d2 of these inclined surfaces and the inner surface of the opening 3c of the outer housing 3 form a pair of contact surfaces that face each other in the first direction D1. The engaging protrusions 83 and 84 further include protrusions 83b and 84b (refer to FIGS. 3 and 4). The protrusion 83b protrudes between the inner surface of the opening 3c on one side of the outer housing 3 and the inclined surface 3d2 of the protrusion 3d on one side. The protrusion 84b also protrudes between the inner surface of the opening 3c on the other side of the outer housing 3 and the inclined surface 3d2 of the protrusion 3d on the other side. The range of movement of the inner housing 6 in the first direction D1 is limited by a gap between the inner surface of the opening 3c and the inclined surface 3d2 of the protrusion 3d.

When the outer housings 3 and 4 are detached from each other, the optical connection structure 1A performs the following operation. When the outer housings 3 and 4 move in a direction where the outer housings 3 and 4 separate from each other, the state of engagement, which has been released, between the hooks 71a and 72a of the engaging protrusions 71 and 72 of the latch mechanism 7A and the opening 3c formed in the side wall of the outer housing 3 is firstly restored. Subsequently, a state of engagement between the hooks 83a and 84a and the engaging surfaces 81a and 82a is released. As illustrated in FIG. 10, the pair of protrusions 3d (only one side is illustrated) are formed on the side walls of the outer housing 3. The cross-sectional shape of the protrusion 3d along a plane defined by the first direction D1 and the third direction D3 is a trapezoidal shape, and the protrusion 3d includes the pair of inclined surfaces 3d1 and 3d2 that are inclined with respect to the first direction D1. The engaging protrusions 83 and 84 further include the protrusions 83b and 84b (refer to FIGS. 3 and 4). The cross-sectional shapes of the protrusions 83b and 84b along a plane defined by the first direction D1 and the third direction D3 are trapezoidal shapes, and the protrusions 83b and 84b include a pair of inclined surfaces 83c and 83d (refer to FIG. 4) that are inclined with respect to the first direction D1. When the inner housings 5 and 6 are coupled to each other, the inclined surfaces 3d1 of the protrusions 3d and the inclined surface 83c of the protrusion 83b come into contact with each other, so that the engaging protrusions 83 and 84 are elastically bent outward and the protrusion 83b climbs over the protrusions 3d. When the coupling between the inner housings 5 and 6 is released, the inclined surfaces 3d2 of the protrusions 3d and the inclined surface 83d of the protrusion 83b come into contact with each other, so that the engaging protrusions 83 and 84 are elastically bent outward, the protrusion 83b climbs over the protrusions 3d, and a state of engagement between the hook 83a and the engaging surface 81a is released.

Effects obtained by the optical connection structure 1A having the foregoing configuration will be described. As described above, in the optical connection structure 1A, (M×N) ferrules 11 held by the outer housing 3 and (M×N) ferrules 11 held by the outer housing 4 are PC connected to each other. In the optical connection structure 1A, firstly, in a state where the movements of the inner housings 6 relative to the outer housing 4 in the pullout direction are restricted by the latch mechanisms 7A, the ferrules 11 on both sides are PC connected to each other. Subsequently, the latch mechanisms 8 operate while a state of contact between the ferrules 11 is maintained. Accordingly, the ferrule 11 and the ferrule 11 corresponding to each other are individually coupled to each other, so that a state of PC connection is maintained. Thereafter, while a state of the coupling is maintained, the respective latch releasing mechanisms 9 release the respective latch mechanisms 7A to release the coupling between the outer housing 3 and the inner housings 5; and thereby, bringing the N inner housings 5 into a state of being floated with respect to the outer housing 3.

According to the optical connection structure 1A, after a series of connection operations, almost no (theoretically, not at all) load is applied to a connection portion between the outer housing 3 and the outer housing 4 by the PC connection. Only M loads are applied to a coupling portion (one latch mechanism 8) between the inner housing 5 and the inner housing 6 by the PC connection. According to the optical connection structure 1A of the present embodiment, it is possible to further reduce the stress generated in the housings by the PC connection, compared to when (M×N)

loads are applied to the connection portion between the outer housing 3 and the outer housing 4 by the PC connection. As a result, it is possible to prevent the housings from being destroyed and to improve the reliability of the optical connection structure.

The number M of the ferrules 11 may be from three to five. For example, when the load required for PC connection between one set of the ferrules 11 is 10 N to 20 N and the number M is five, the load applied to the coupling portion (one latch mechanism 8) between the inner housing 5 and the inner housing 6 is 50 N to 100 N. In a case where this degree of load is applied, even when the coupling portion between the inner housing 5 and the inner housing 6 is made of a resin, the coupling portion is capable of sufficiently withstanding the load. The larger the number M, the more efficiently a large number of optical fibers can be collectively connected to each other, and thus it is desirable that the number M is, for example, three or greater.

One inner housing (for example, the inner housing 6) of the inner housings 5 and 6 may include the protrusions 66 protruding toward the other inner housing (for example, the inner housing 5), and the other inner housing may include the holes 56 into which the protrusions 66 are fitted. Accordingly, it is possible to relatively accurately position the inner housing 5 and the inner housing 6.

The outer housings 3 and 4 may further include the fixing structure (for example, the grooves 4b and the screw holes 3b) to fix the outer housings 3 and 4 to each other. Accordingly, it is possible to suitably hold the outer housing 4 after the inner housings 5 have been floated (have been in a state of floating). As long as the fixing structure is configured to be able to detachably fix the outer housings 3 and 4 to each other, the fixing structure is not limited to the grooves 4b and the screw holes 3b, and is capable of adopting various configurations.

When the outer housings 3 and 4 are detached from each other, in all of the inner housings 5 and the corresponding inner housings 6, the latch mechanisms 8 for the inner housings 5 and the corresponding inner housings 6 may be released after the latch mechanisms 7A of the inner housings 5 are coupled. Accordingly, it is possible to cause the optical connection structure 1A to reliably return to a state before connection. Thus, it is possible to connect the optical connection structure 1A again according to the foregoing procedure.

The outer housing 3 may further include the pair of contact surfaces, which are the inner surface of the opening 3c and the inclined surface 3d2 of the protrusion 3d, facing each other in the first direction D1. The inner housing 6 may include the protrusions 83b and 84b that protrude between the pair of contact surfaces, and the range of movement of the inner housing 6 in the first direction D1 may be limited by the gap between the pair of contact surfaces. Accordingly, it is possible to stably maintain a state of floating of the inner housing 5.

Modification Example

In the above embodiment, in the middle of connection of the outer housing 3 and the outer housing 4, specifically, until the latch mechanisms 8 operate from when the ferrules 11 on both sides come into contact with each other, the (M×N) loads are applied to the entirety of the outer housings 3 and 4 by PC connection. As one method for avoiding such a case, when the outer housing 3 and the outer housing 4 are connected to each other, it is considered that after the latch mechanism 7A of an inner housing 5 is released, another inner housing 5 and the corresponding inner housing 6 are coupled to each other by the latch mechanism 8. In that case, it is possible to disperse the loads over time which are applied to the outer housings 3 and 4 until the latch mechanisms 7A are released.

Figure 11:
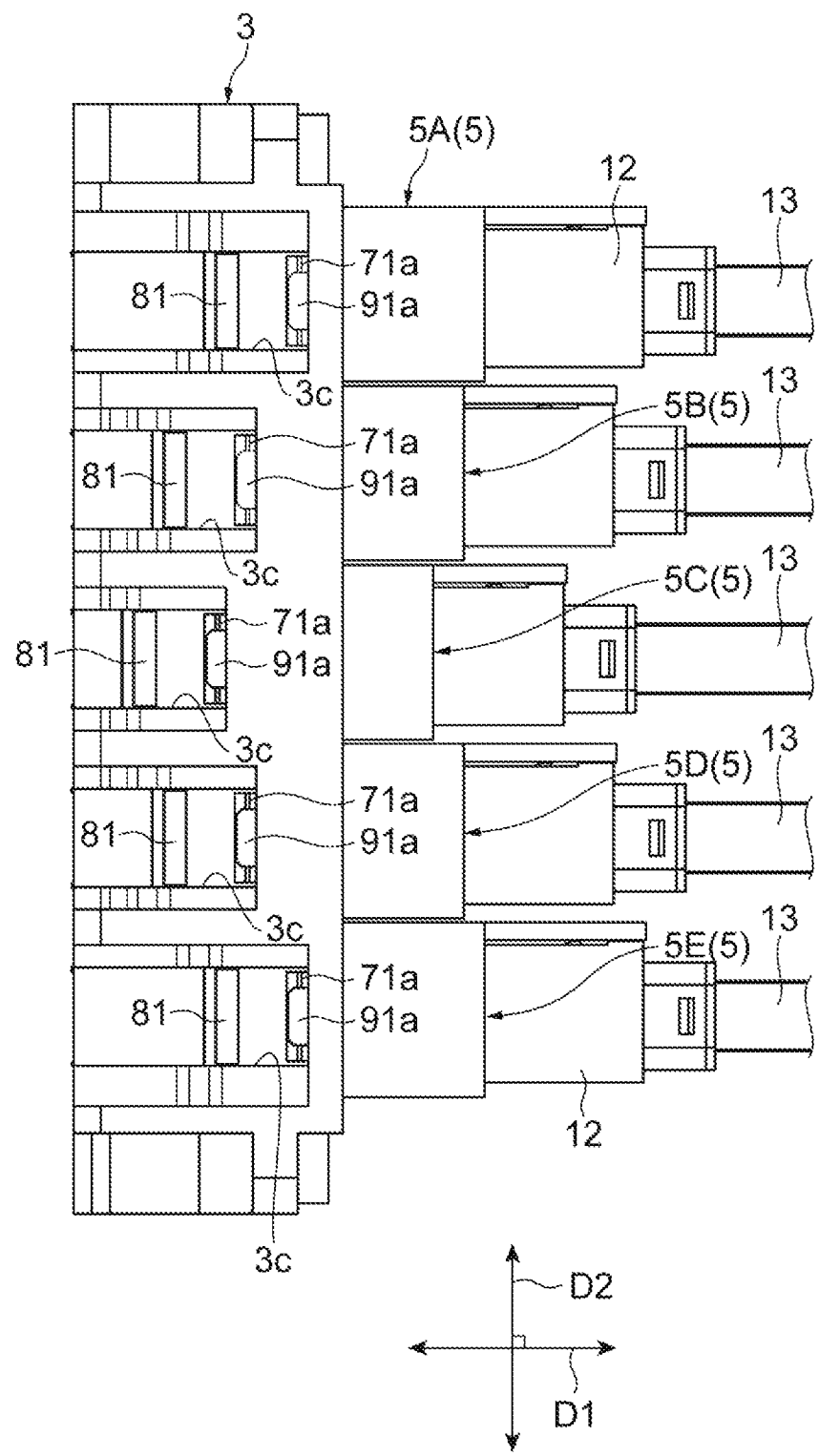
FIG. 11 is a view schematically illustrating one example of an optical connection structure according to a modification example.

FIG. 11 is a view schematically illustrating one example of such a method. In this method, in a state where an inner housing 5C among five inner housings 5, which is positioned at the center in the second direction D2, is located at a foremost position with respect to other inner housings 5A, 5B, 5D, and 5E, the latch mechanism 7A of the inner housing 5C operates. In other words, an inner surface of the opening 3c of the outer housing 3, which forms the latch mechanism 7A of the inner housing 5C, is located at the foremost position with respect to the latch mechanisms 7A of the other inner housings 5A, 5B, 5D, and 5E in the first direction D1. In a state where the other inner housings 5B and 5D among the N inner housings 5, which are positioned on both sides of the inner housing 5C in the second direction D2, are located at foremost positions with respect to the remaining inner housings 5A and 5E (namely, the inner housings that are positioned on an opposite side with respect to the inner housing 5C when viewed from the inner housings 5B and 5D), the latch mechanisms 7A of the inner housings 5B and 5D operate. In other words, the inner surface of the opening 3c of the outer housing 3, which forms the latch mechanisms 7A of the inner housings 5B and 5D, is located at the foremost position with respect to the latch mechanisms 7A of the remaining inner housings 5A and 5E in the first direction D1.

According to such a configuration, when the outer housings 3 and 4 are connected to each other, after the latch mechanism 7A of the inner housing 5C is released, the inner housings 5B and 5D and the corresponding inner housings 5 are coupled to each other by the latch mechanisms 8. After the latch mechanisms 7A of the inner housings 5B and 5D are released, the inner housings 5A and 5E and the corresponding inner housings 5 are coupled to each other by the latch mechanisms 8. Thus, it is possible to more effectively realize the dispersion of the loads over time which are applied to the outer housings 3 and 4 until the latch mechanisms 7A are released. Since the symmetry with respect to the second direction D2 is good, the outer housing 4 can be pushed and connected in a well-balanced manner along the first direction D1 so as not to be inclined with respect to the second direction D2. When N is an even number greater than or equal to six, in a state where two inner housings 5 among the N inner housings 5, which are positioned at the center in the second direction D2, are located at foremost positions, the latch mechanisms 7A of the inner housings 5 may operate.

Figure 12:
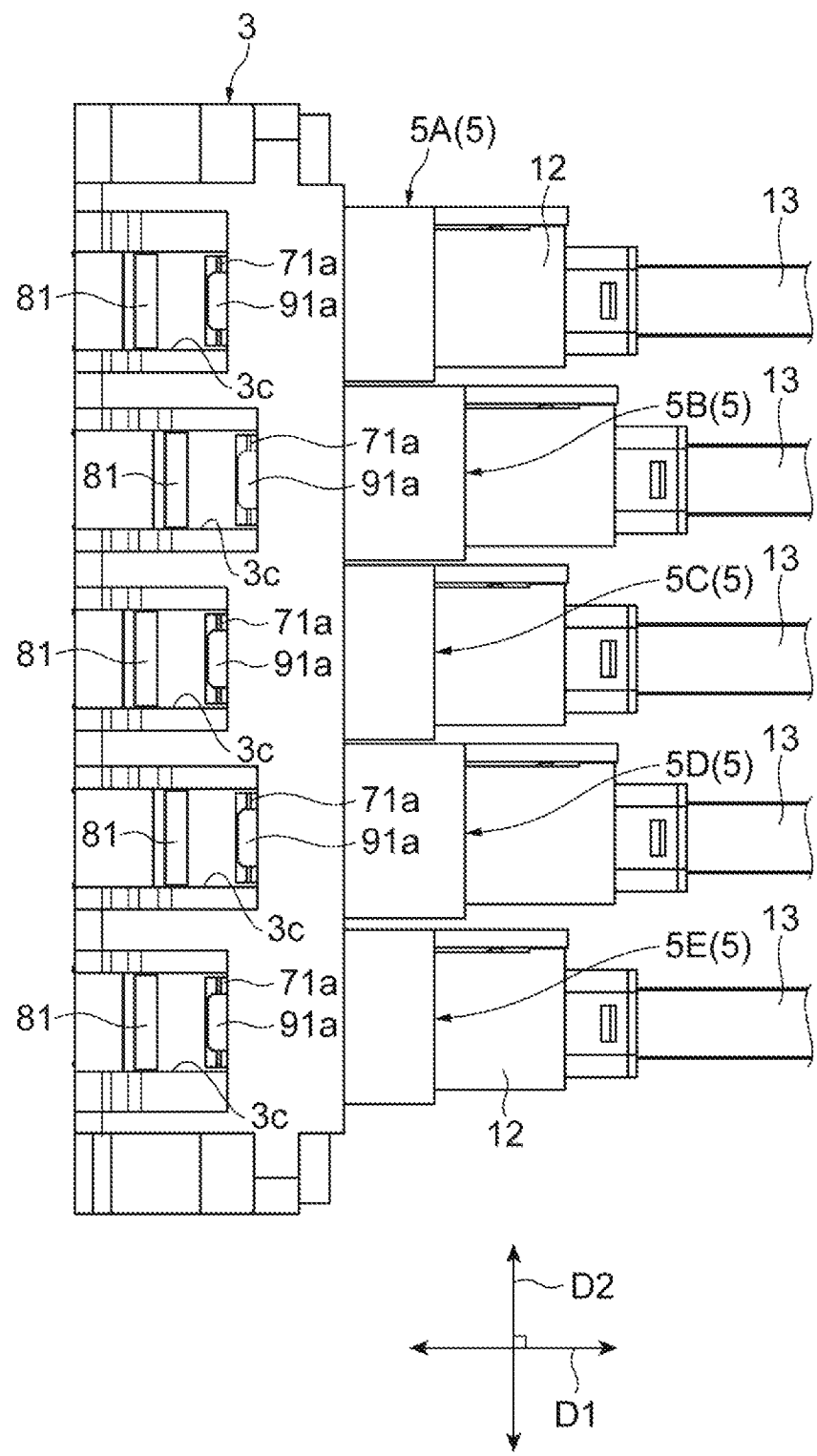
FIG. 12 is a view schematically illustrating another example of an optical connection structure according to a modification example.

FIG. 12 is a view schematically illustrating another method of the present modification example. In this method, in a state where three inner housings 5A, 5C, and 5E among the five inner housings 5 are located at foremost positions with respect to the other inner housings 5B and 5D, the latch mechanism 7A of each of the inner housings 5 operates. Namely, in this example, the inner housings 5A, 5C, and 5E of which the latch mechanisms 7A are positioned relatively forward and the inner housings 5B and 5D of which the latch mechanisms 7A are positioned relatively rearward are alternately disposed in the second direction D2. In such a method, it is also possible to disperse the loads over time which are applied to the outer housings 3 and 4 until the latch mechanisms 7A are released. Since the symmetry with respect to the second direction D2 is good, the outer housing 4 can be pushed and connected in a well-balanced manner along the first direction D1 so as not to be inclined with respect to the second direction D2.

Figure 13:
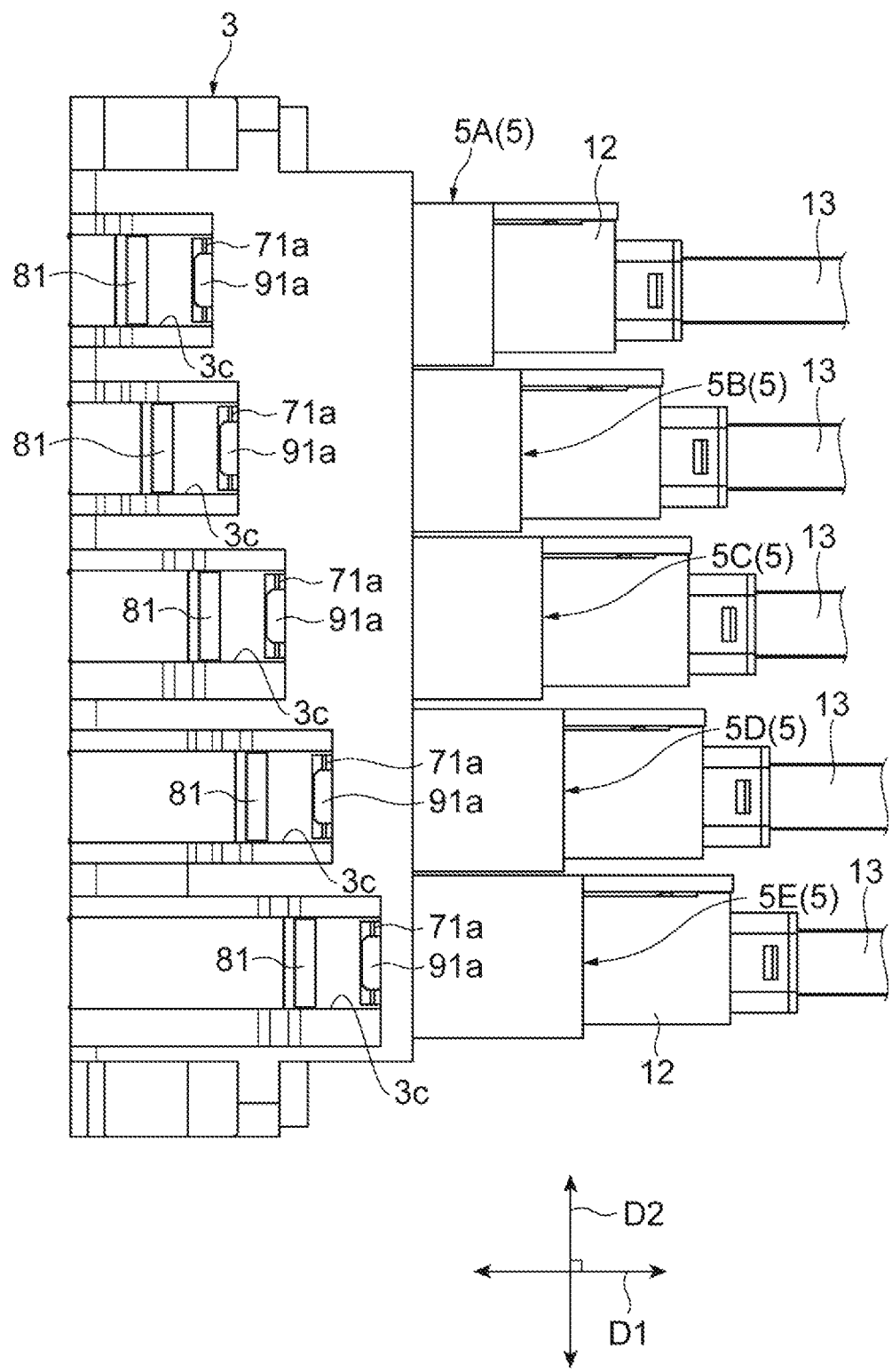
FIG. 13 is a view schematically illustrating still another example of an optical connection structure according to a modification example.

FIG. 13 is a view schematically illustrating still another method of the present modification example. In this method, the latch mechanisms 7A of the inner housings 5 operate such that one inner housing 5A among the five inner housings 5 is located at a foremost position and thereafter, the inner housing 5B to the inner housing 5E are positioned further rearward in order. Namely, in this example, the latch mechanism 7A of the inner housing 5A is located at a foremost position and thereafter, the latch mechanism 7A of the inner housing 5B to the latch mechanism 7A of the inner housing 5E are positioned further rearward in order. According to such a method, after the latch mechanism 7A of an $n^{th}$ (n=1, . . . , N−1) inner housing 5 among the N inner housings 5 is released, an $n+1^{th}$ inner housing 5 and the corresponding inner housing 6 are coupled to each other by the latch mechanism 8. Thus, it is possible to more effectively realize the dispersion of the loads over time which are applied to the outer housings 3 and 4 until the latch mechanisms 7A are released.

The optical connection structure according to the present invention is not limited to the foregoing embodiments, and other various modifications can be made. For example, in the foregoing embodiments, PC connection has been described; however, the optical connection structure according to the present invention can be effectively used also in non-PC connection. It has to be considered that the embodiments disclosed this time are provided as an example in all aspects and the present invention is not limited thereto. It is intended that the scope of the present invention is implied not by the foregoing description but by the claims and the present invention includes all modifications within the concept and the scope equivalent to the claims.

REFERENCE SIGNS LIST

1A: optical connection structure, 3, 4: outer housing, 3a, 4a: insertion hole, 3b: screw hole, 3c: opening, 3d: protrusion, 3d1, 3d2: inclined surface, 4b: groove, 4c: opening, 5, 6: inner housing, 5A, 5B, 5C, 5D, 5E: inner housing, 5a, 6a: front end surface, 5b, 6b: rear end surface, 5c, 5d, 6c, 6d: side surface, 7A, 7B, 8: latch mechanism, 9: latch releasing mechanism, 10A, 10B: optical connector component, 11: ferrule, 11a: front end surface, 12: rear housing, 13: optical fiber, 16: engaging structure, 18: pin keeper, 31, 32: pin, 51, 61: insertion hole, 52, 62: eave, 53, 63: engaging structure, 56: hole, 66: protrusion, 71 to 74: engaging protrusion, 71a, 72a, 73a, 74a: hook, 81, 82: engaging protrusion, 81a, 82a: engaging surface, 83, 84: engaging protrusion, 83a, 84a: hook, 83b, 84b: protrusion, 83c, 83d: inclined surface, 91a, 91b: inclined surface, 92a, 92b: inclined surface.

The invention claimed is:

1. An optical connection structure comprising:
N first inner housings each configured to hold M first ferrules in a state where end surfaces of the first ferrules of which each holds an end portion of a first optical fiber extending along a first direction are exposed, wherein N is an integer of two or greater and M is an integer of one or greater;
a first outer housing that holds the N first inner housings in a state of being arranged in a second direction intersecting the first direction;
N second inner housings each configured to hold M second ferrules in a state where end surfaces of the second ferrules of which each holds an end portion of a second optical fiber extending along the first direction are exposed;
a second outer housing that holds the N second inner housings in a state of being arranged in the second direction, wherein the first outer housing and the second outer housing are configured such that the first ferrules and the second ferrules corresponding to each other are connected to each other while the end surfaces of the first ferrules and the end surfaces of the second ferrules come into contact with each other;
one or more first latch mechanisms configured to individually restrict movements of the first inner housings relative to the first outer housing in a pullout direction;
one or more second latch mechanisms configured to individually couple the first inner housings and the second inner housings corresponding to each other; and
one or more latch releasing mechanisms configured to release the first latch mechanisms of the first inner housings in a state where the first inner housings and the second inner housings are coupled to each other by the second latch mechanisms wherein,
when the first outer housing and the second outer housing are connected to each other, the first latch mechanism of one first inner housing of the N first inner housings, positioned at a center in the second direction is released, and then other first inner housings of the N first inner housings, positioned on both sides of the one first inner housing and corresponding second inner housings of the N second inner housings are coupled to each other by the second latch mechanisms, and the first latch mechanisms of the other first inner housings are released, and then still other first inner housings of the N first inner housings, which are positioned opposite to the one first inner housing positioned at the center with respect to the other first inner housings, and corresponding second inner housings of the N second inner housings are coupled to each other by the second latch mechanisms.

2. An optical connection structure comprising:
N first inner housings each configured to hold M first ferrules in a state where end surfaces of the first ferrules of which each holds an end portion of a first optical fiber extending along a first direction are exposed, wherein N is an integer of two or greater and M is an integer of one or greater;
a first outer housing that holds the N first inner housings in a state of being arranged in a second direction intersecting the first direction;
N second inner housings each configured to hold M second ferrules in a state where end surfaces of the second ferrules of which each holds an end portion of a second optical fiber extending along the first direction are exposed;
a second outer housing that holds the N second inner housings in a state of being arranged in the second direction, wherein the first outer housing and the second outer housing are configured such that the first ferrules and the second ferrules corresponding to each other are connected to each other while the end surfaces of the first ferrules and the end surfaces of the second ferrules come into contact with each other;
one or more first latch mechanisms configured to individually restrict movements of the first inner housings relative to the first outer housing in a pullout direction;

one or more second latch mechanisms configured to individually couple the first inner housings and the second inner housings corresponding to each other; and one or more latch releasing mechanisms configured to release the first latch mechanisms of the first inner housings in a state where the first inner housings and the second inner housings are coupled to each other by the second latch mechanisms wherein, when the first outer housing and the second outer housing are connected to each other, the first latch mechanism of an $n^{th}$ (n=1, ..., N−1) first inner housing of the N first inner housings is released, and then an $n+1^{th}$ first inner housing of the N first inner housings and a corresponding second inner housing of the N second inner housings are coupled to each other by the second latch mechanism.

3. An optical connection structure comprising:

N first inner housings each configured to hold M first ferrules in a state where end surfaces of the first ferrules of which each holds an end portion of a first optical fiber extending along a first direction are exposed, wherein N is an integer of two or greater and M is an integer of one or greater;

a first outer housing that holds the N first inner housings in a state of being arranged in a second direction intersecting the first direction;

N second inner housings each configured to hold M second ferrules in a state where end surfaces of the second ferrules of which each holds an end portion of a second optical fiber extending along the first direction are exposed;

a second outer housing that holds the N second inner housings in a state of being arranged in the second direction, wherein the first outer housing and the second outer housing are configured such that the first ferrules and the second ferrules corresponding to each other are connected to each other while the end surfaces of the first ferrules and the end surfaces of the second ferrules come into contact with each other;

one or more first latch mechanisms configured to individually restrict movements of the first inner housings relative to the first outer housing in a pullout direction;

one or more second latch mechanisms configured to individually couple the first inner housings and the second inner housings corresponding to each other; and one or more latch releasing mechanisms configured to release the first latch mechanisms of the first inner housings in a state where the first inner housings and the second inner housings are coupled to each other by the second latch mechanisms, wherein, when the first outer housing and the second outer housing are connected to each other, the first latch mechanism of one first inner housing of the N first inner housings is released, and then another first inner housing of the N first inner housings and a corresponding second inner housing of the N second inner housings are coupled to each other by the second latch mechanism.

4. The optical connection structure according to claim 3, wherein the one first inner housing and the another first inner housing are alternately disposed in the second direction.

5. The optical connection structure according to claim 3, further comprising:

the M first ferrules held by one first inner housing of the N first inner housings; and the M second ferrules held by one second inner housing of the N second inner housings, wherein the number M of the first ferrules and of the second ferrules is from three to five.

6. The optical connection structure according to claim 3, wherein one inner housing of one first inner housing of the N first inner housings and one second inner housing of the N second inner housings includes a protrusion protruding toward the other inner housing of the one first inner housing and the one second inner housing, and the other inner housing includes a hole into which the protrusion is fitted.

7. The optical connection structure according to claim 3, wherein the first outer housing and the second outer housing further include a fixing structure to fix the first outer housing and the second outer housing to each other.

8. The optical connection structure according to claim 3, wherein, when the first outer housing and the second outer housing are detached from each other, in all of the first inner housings and the corresponding second inner housings, the second latch mechanisms are released after the first latch mechanisms are coupled.

9. The optical connection structure according to claim 3, wherein the first outer housing further includes a pair of contact surfaces facing each other in the first direction, and a second inner housing of the N second inner housings includes a protrusion protruding between the pair of contact surfaces, and wherein a range of a movement of the second inner housing in the first direction is limited by a gap between the pair of contact surfaces.

10. The optical connection structure according to claim 3, wherein the first latch mechanism includes a first engaging protrusion provided in a first inner housing of the N first inner housings, the first engaging protrusion extending along the first direction and being elastically deformable, and an opening provided in the first outer housing, and wherein the first engaging protrusion is provided with a first hook structure that engages with the opening.

11. The optical connection structure according to claim 10, wherein the first hook structure includes a pair of hooks spaced apart from each other along the second direction, the pair of hooks each extending outward along a third direction intersecting the first direction and the second direction.

12. The optical connection structure according to claim 3, wherein the second latch mechanism includes a second engaging protrusion provided in a first inner housing of the N first inner housings, and a third engaging protrusion provided in a second inner housing of the N second inner housings, and wherein the second engaging protrusion engages with the third engaging protrusion.

13. The optical connection structure according to claim 12, wherein the second engaging protrusion includes a portion extending outward from a side surface of the first inner housing along a third direction intersecting the first direction and the second direction, and the third engaging protrusion includes a portion extending inward along the third direction.

14. The optical connection structure according to claim 12, wherein each of the second engaging protrusion and the third engaging protrusion includes a surface intersecting the first direction.

15. The optical connection structure according to claim 12, wherein the third engaging protrusion includes an elastically deformable portion extending along the first direction, and a second hook structure extending inside the second inner housing from the elastically deformable portion.

16. The optical connection structure according to claim 15, wherein the third engaging protrusion further includes a protrusion protruding outside the second inner housing from the elastically deformable portion.

17. The optical connection structure according to claim 3, wherein the latch releasing mechanism includes a first inclined surface provided in a first inner housing of the N first inner housings to work with the first latch mechanism, the first inclined surface being inclined with respect to the first direction, and a second inclined surface provided in a second inner housing of the N second inner housings to work with the second latch mechanism, the second inclined surface being inclined with respect to the first direction.

18. The optical connection structure according to claim 17, wherein the first inclined surface is provided proximate to an engaging region in the first latch mechanism, and the second inclined surface is provided proximate to an engaging region in the second latch mechanism.

19. The optical connection structure according to claim 17, wherein the latch releasing mechanism is configured such that the first inclined surface and the second inclined surface separate from each other when the movement of the first inner housing relative to the first outer housing in the pullout direction is restricted by the first latch mechanism, and the first inclined surface and the second inclined surface come into contact with each other when the first latch mechanism is released by the latch releasing mechanism.

\* \* \* \* \*